United States Patent Office 3,136,991
Patented June 9, 1964

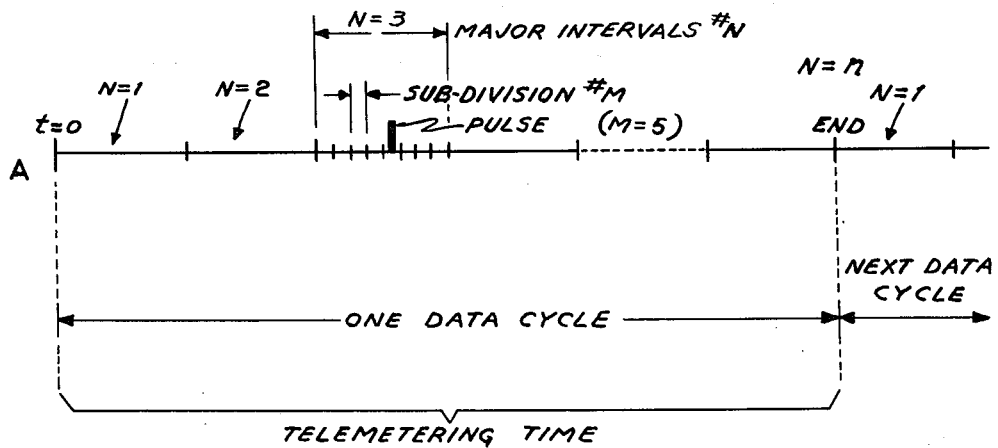
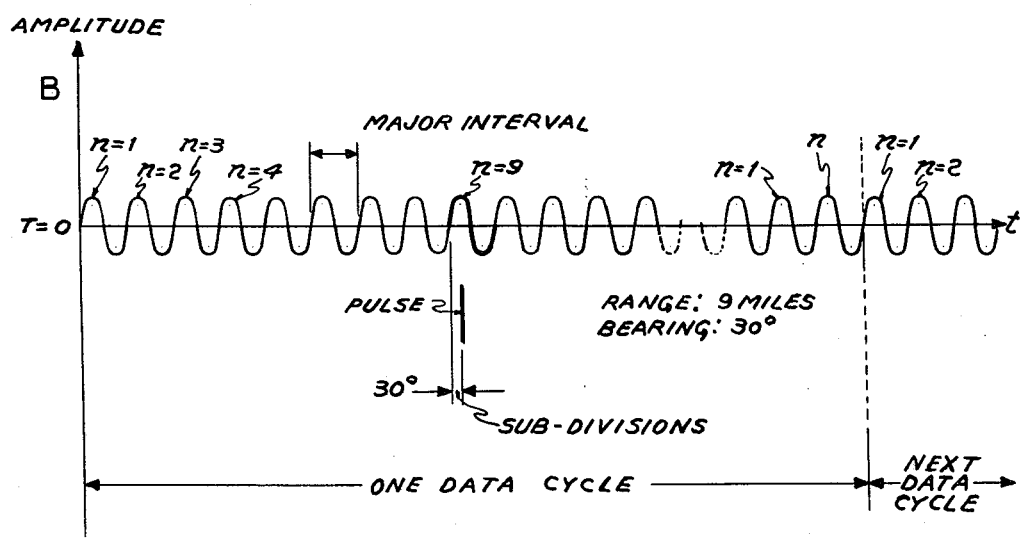

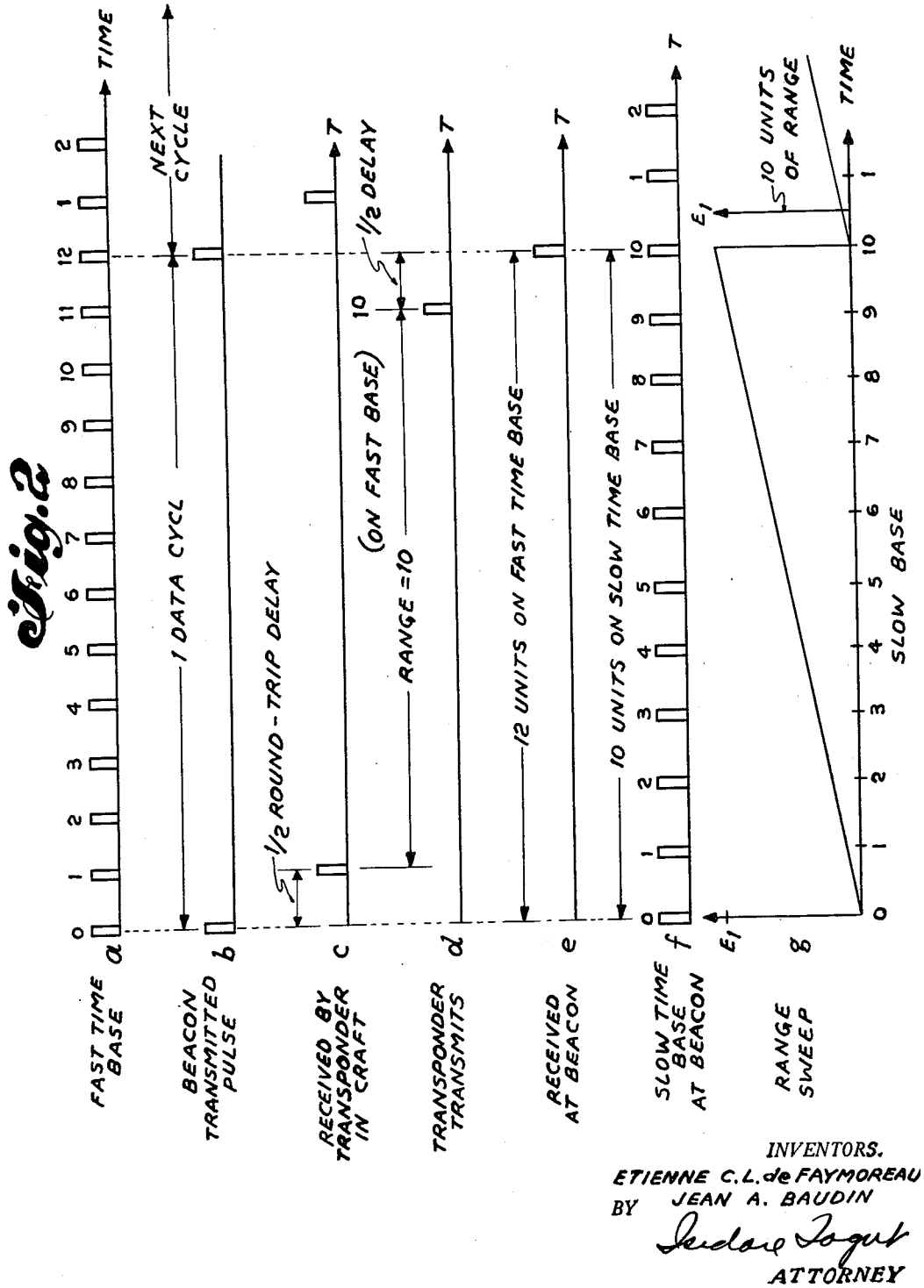

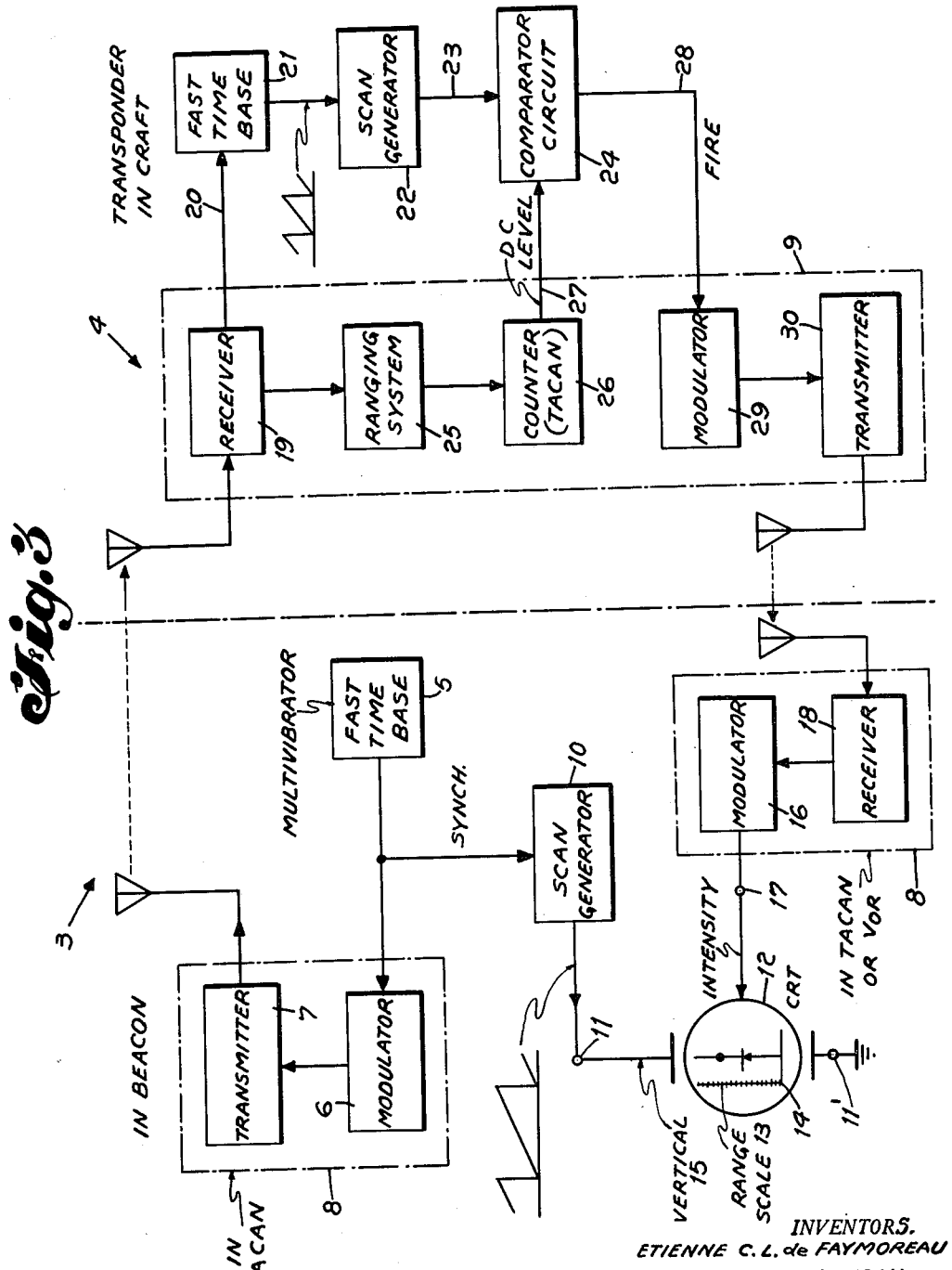

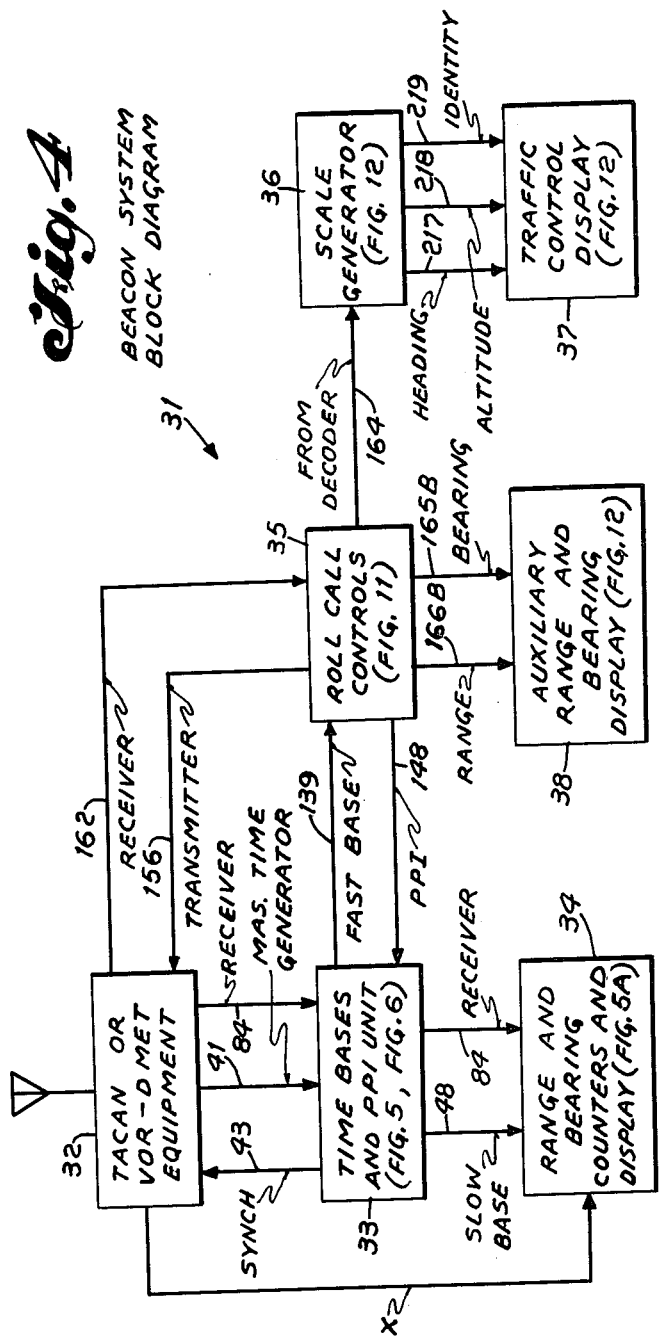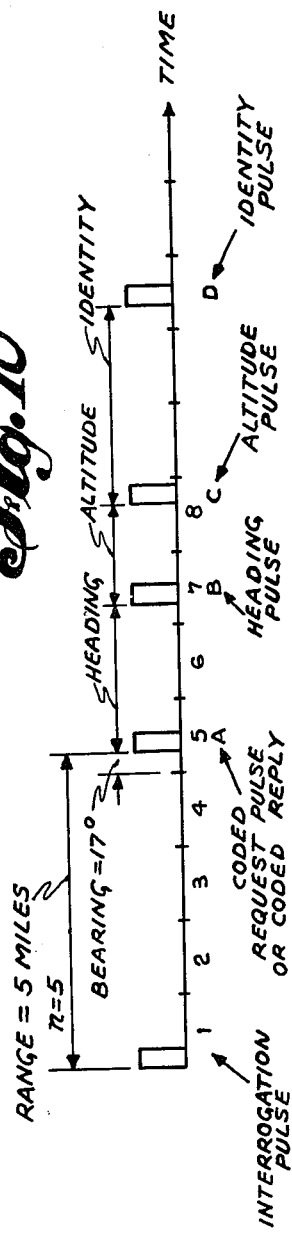

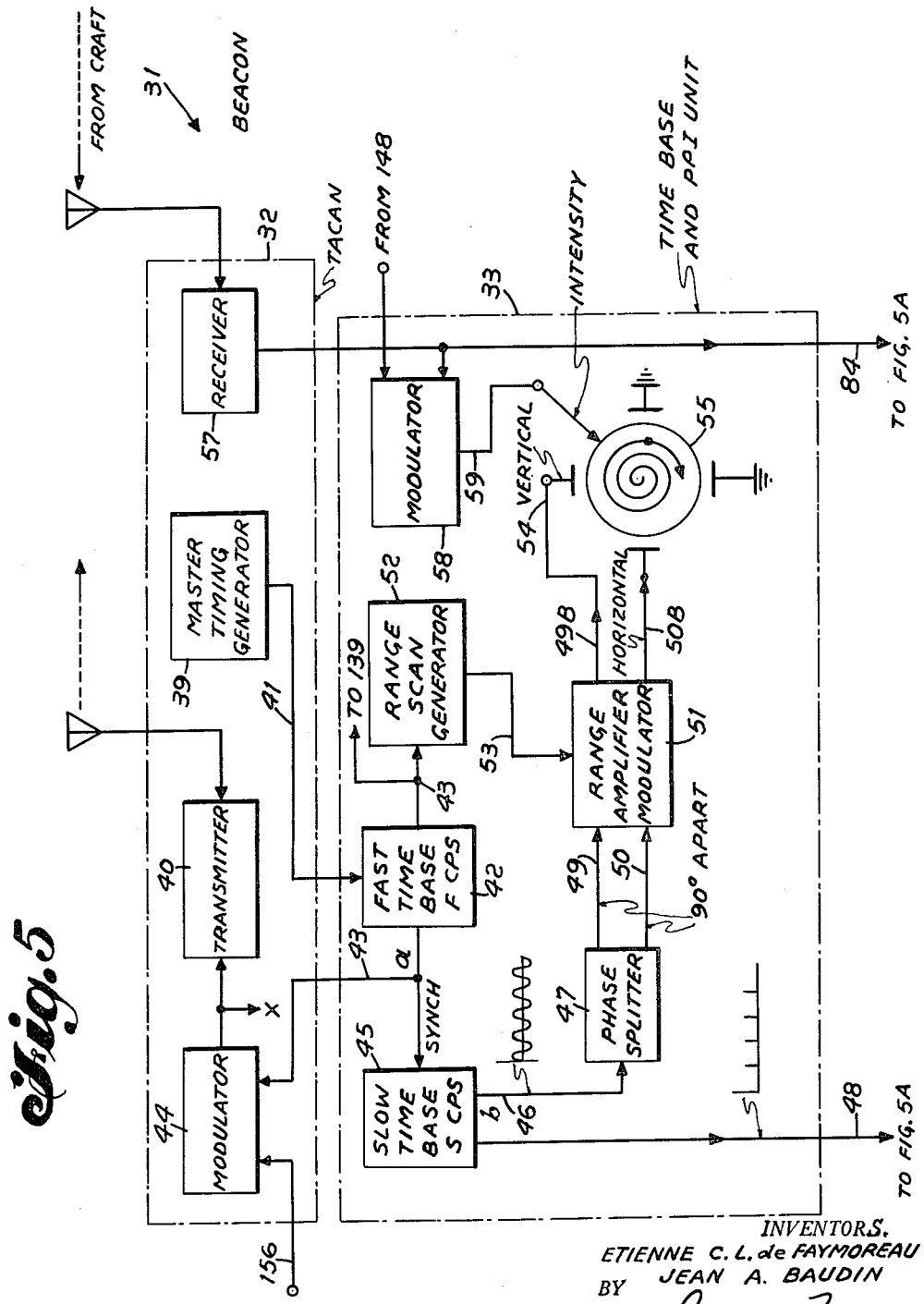

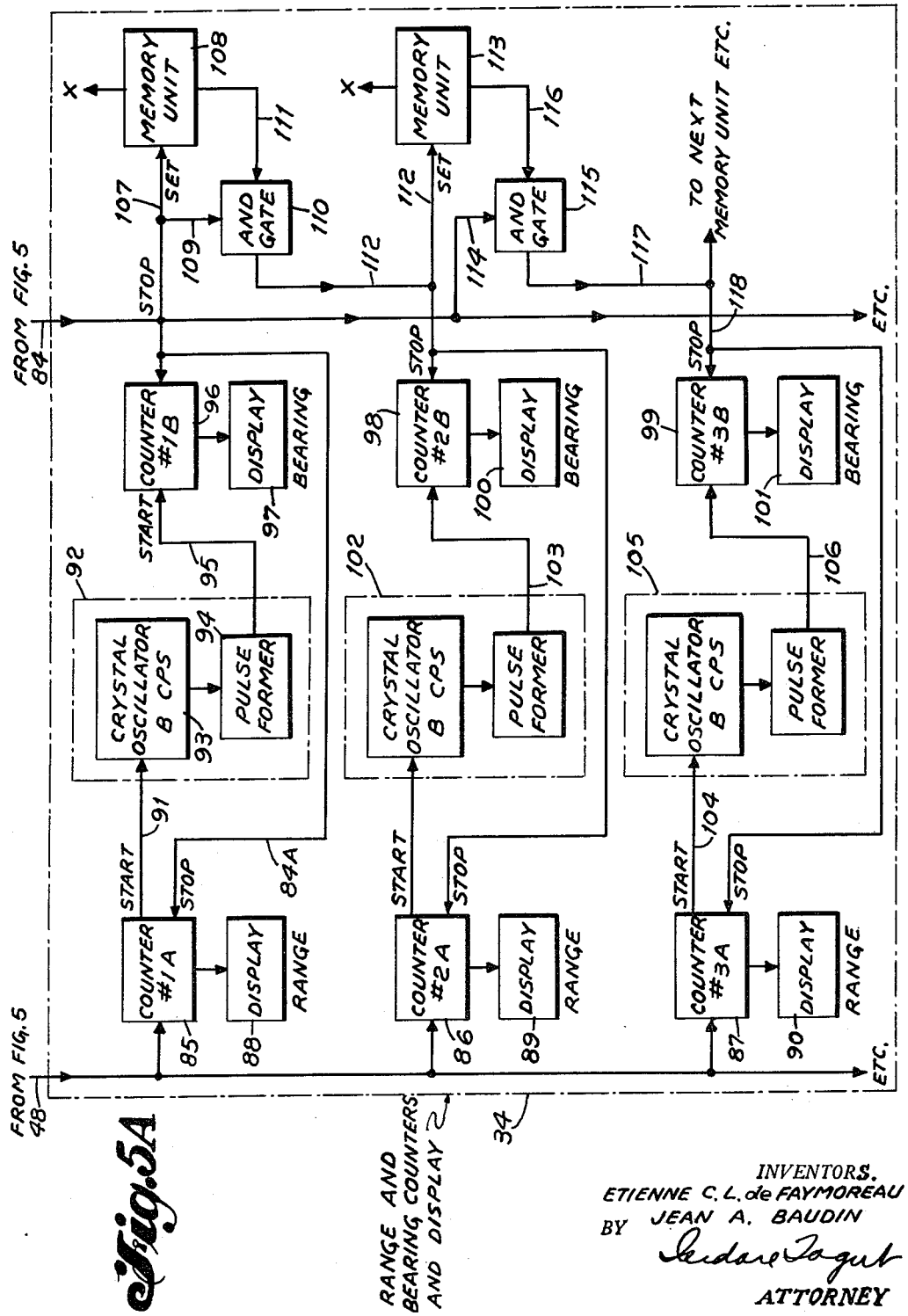

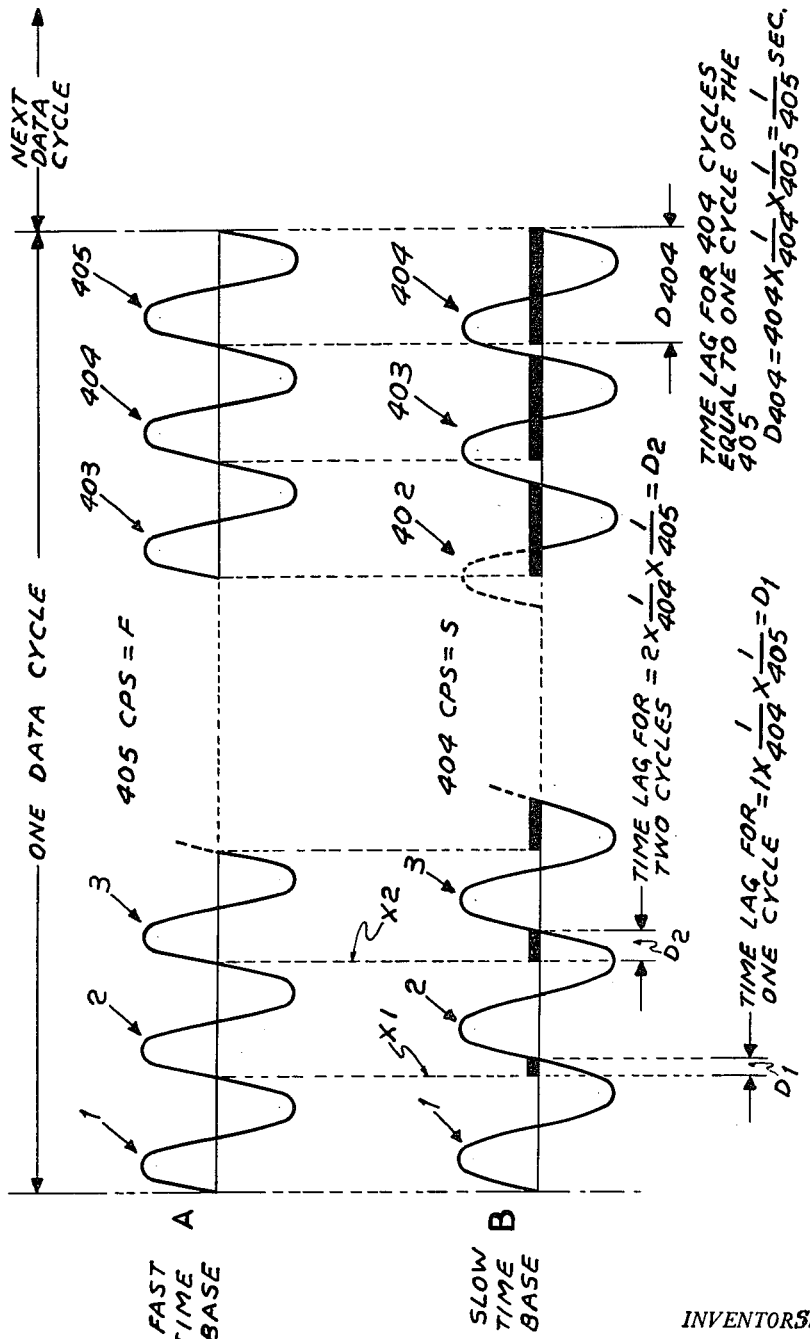

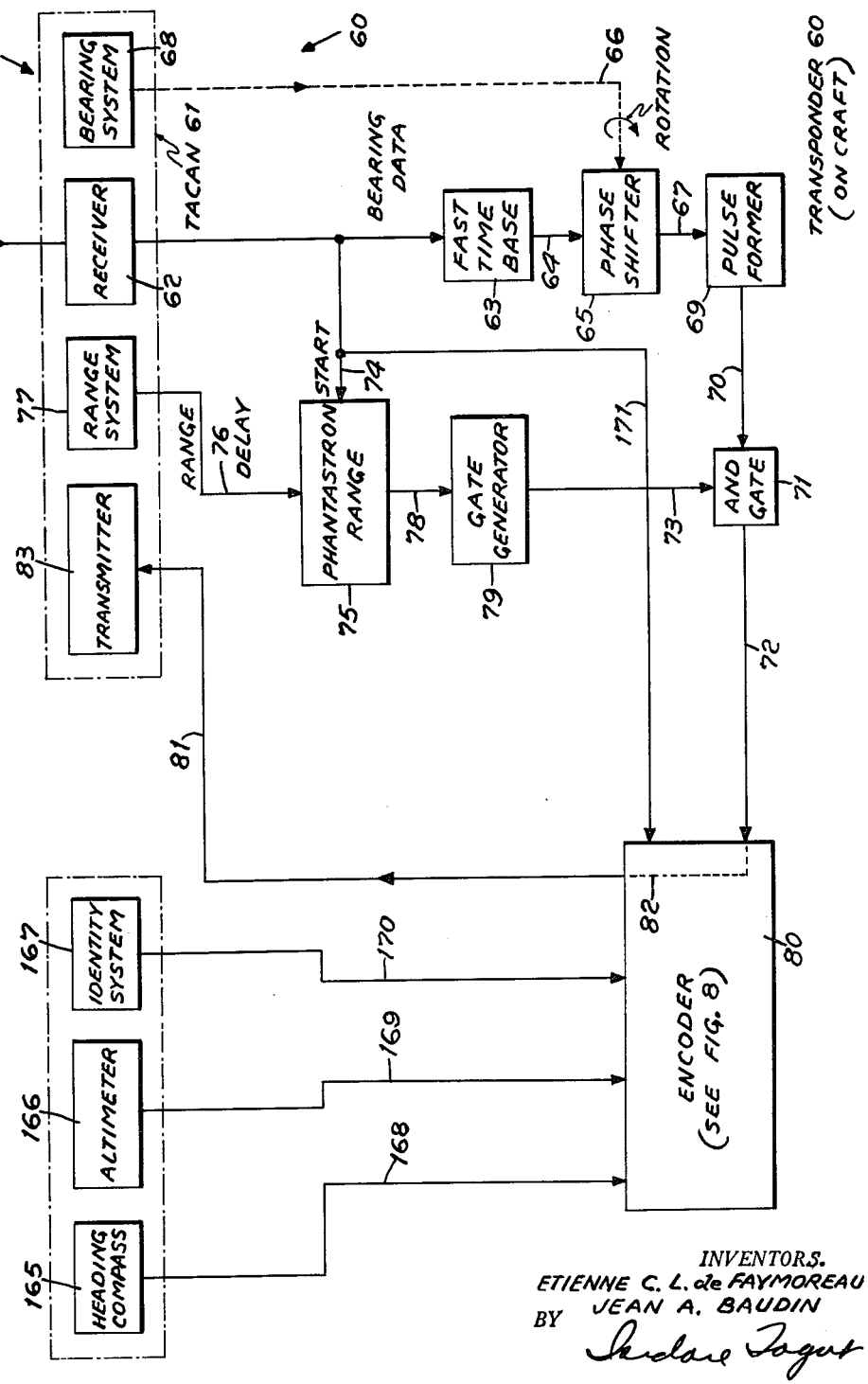

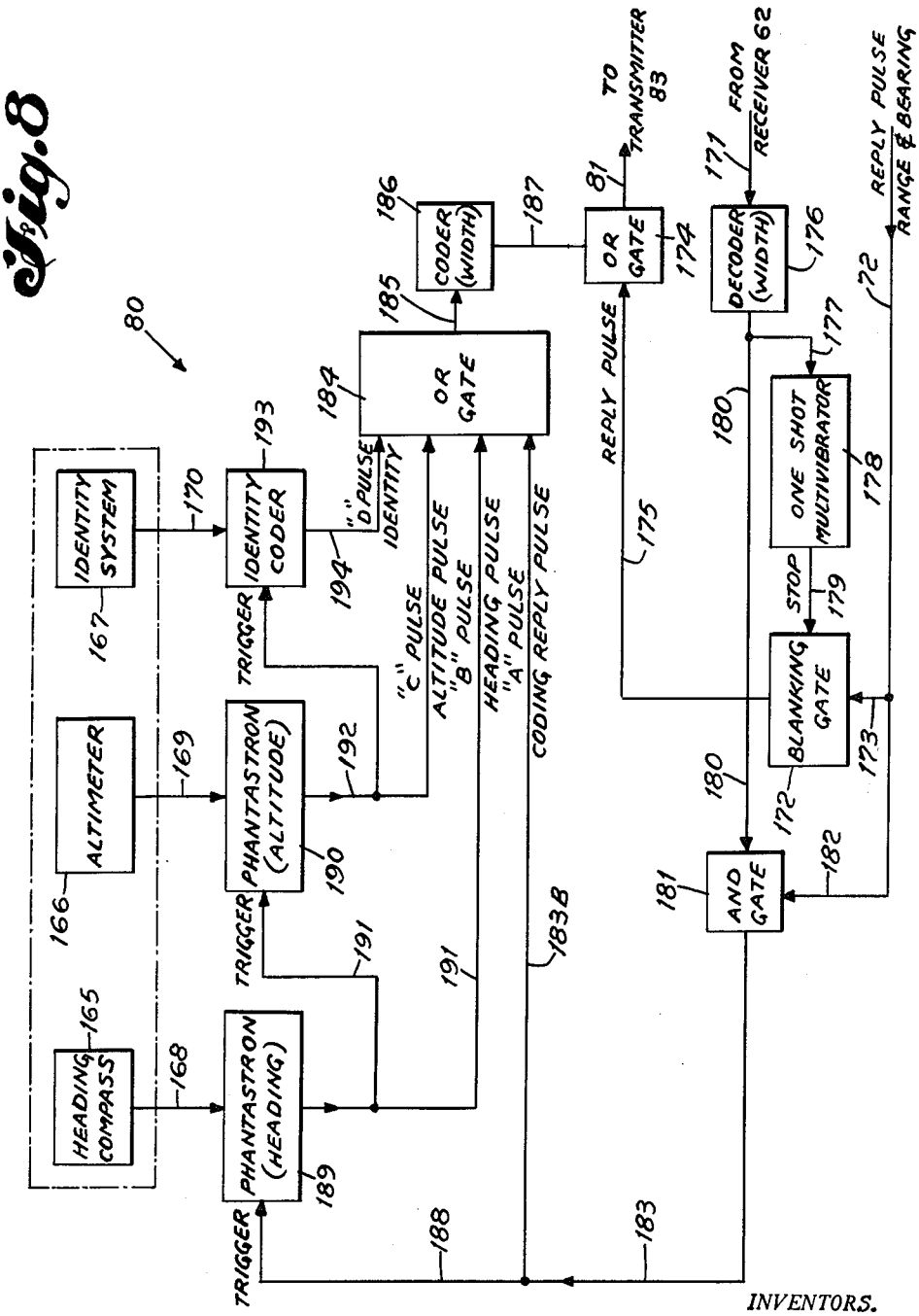

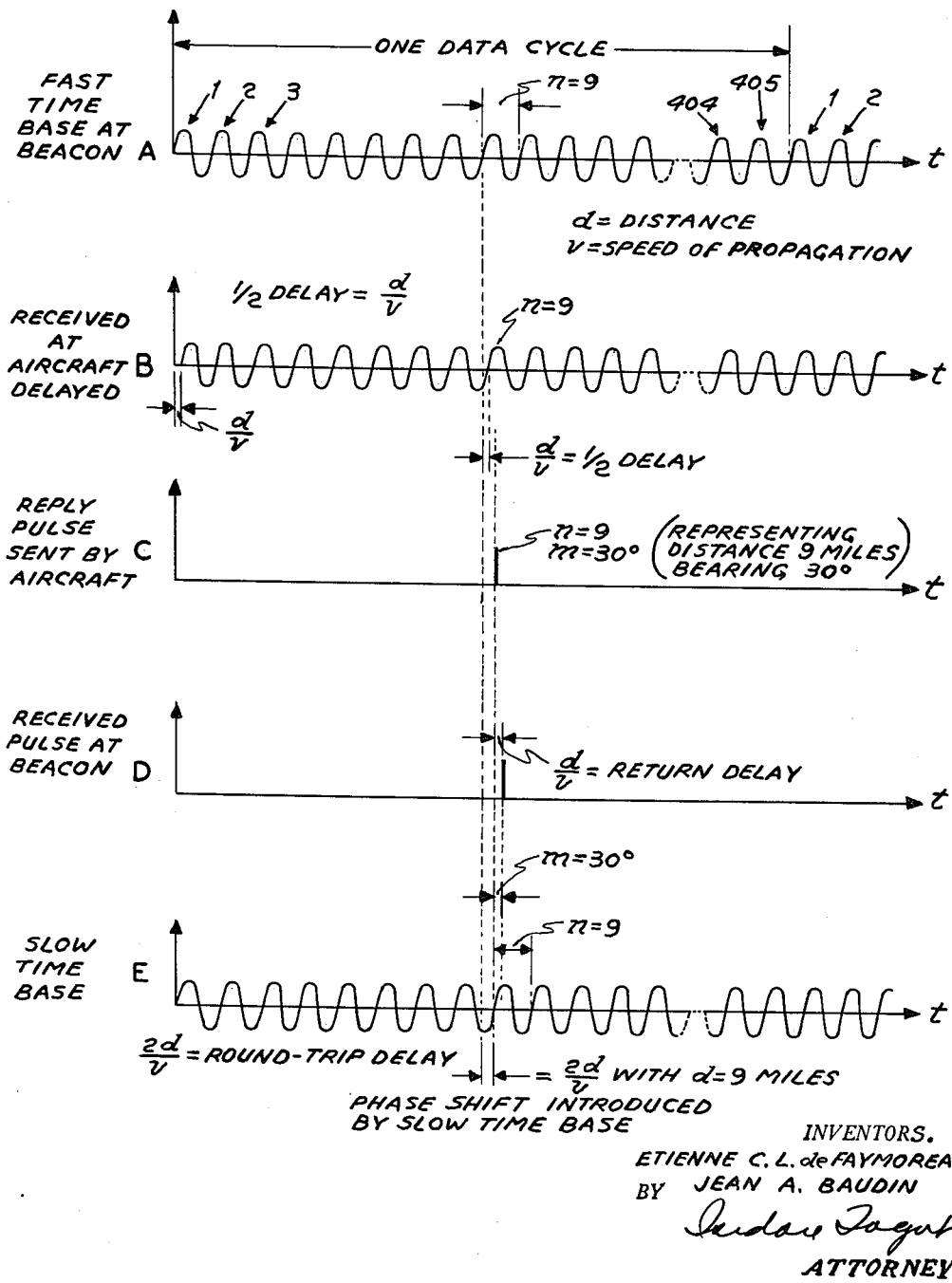

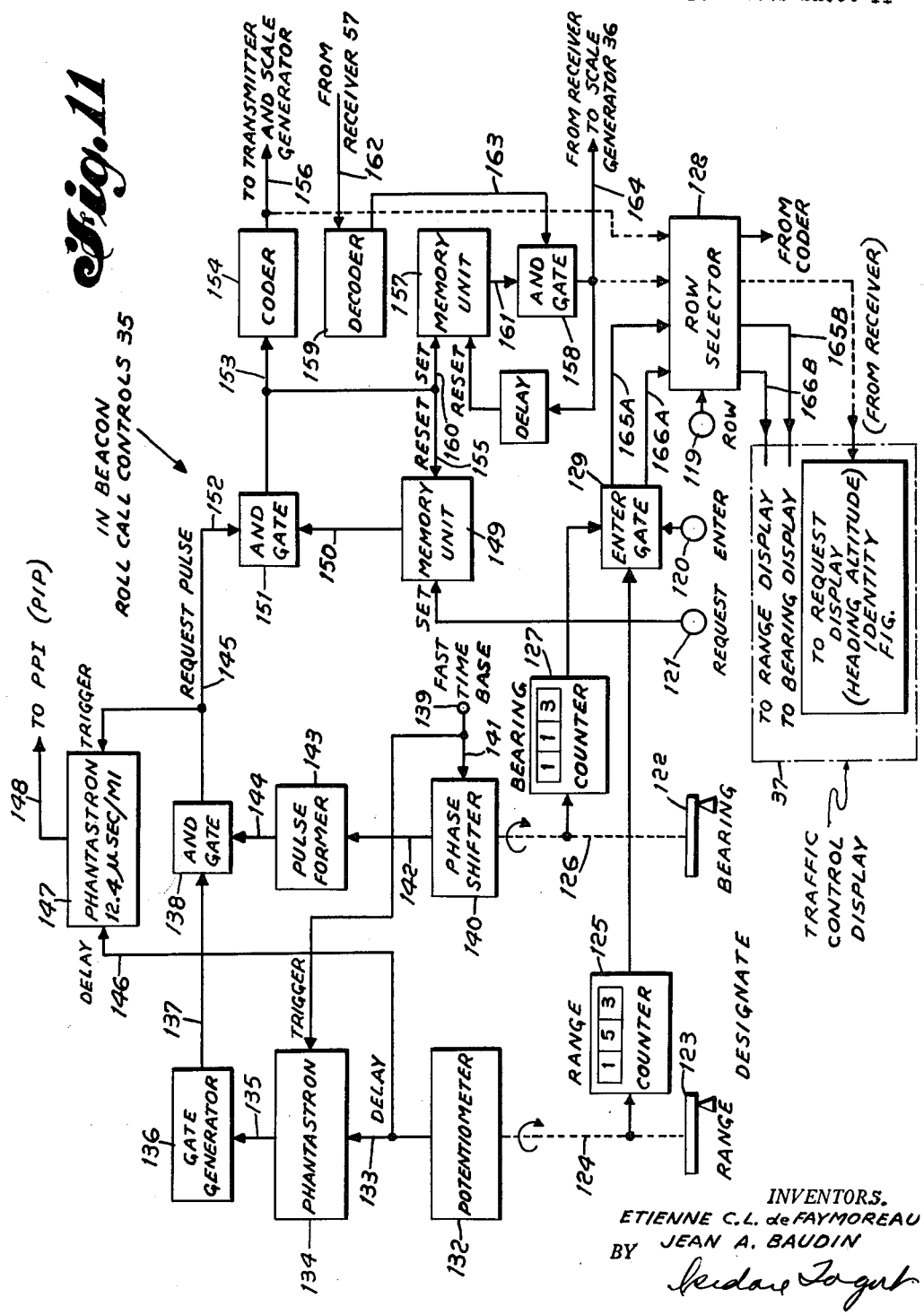

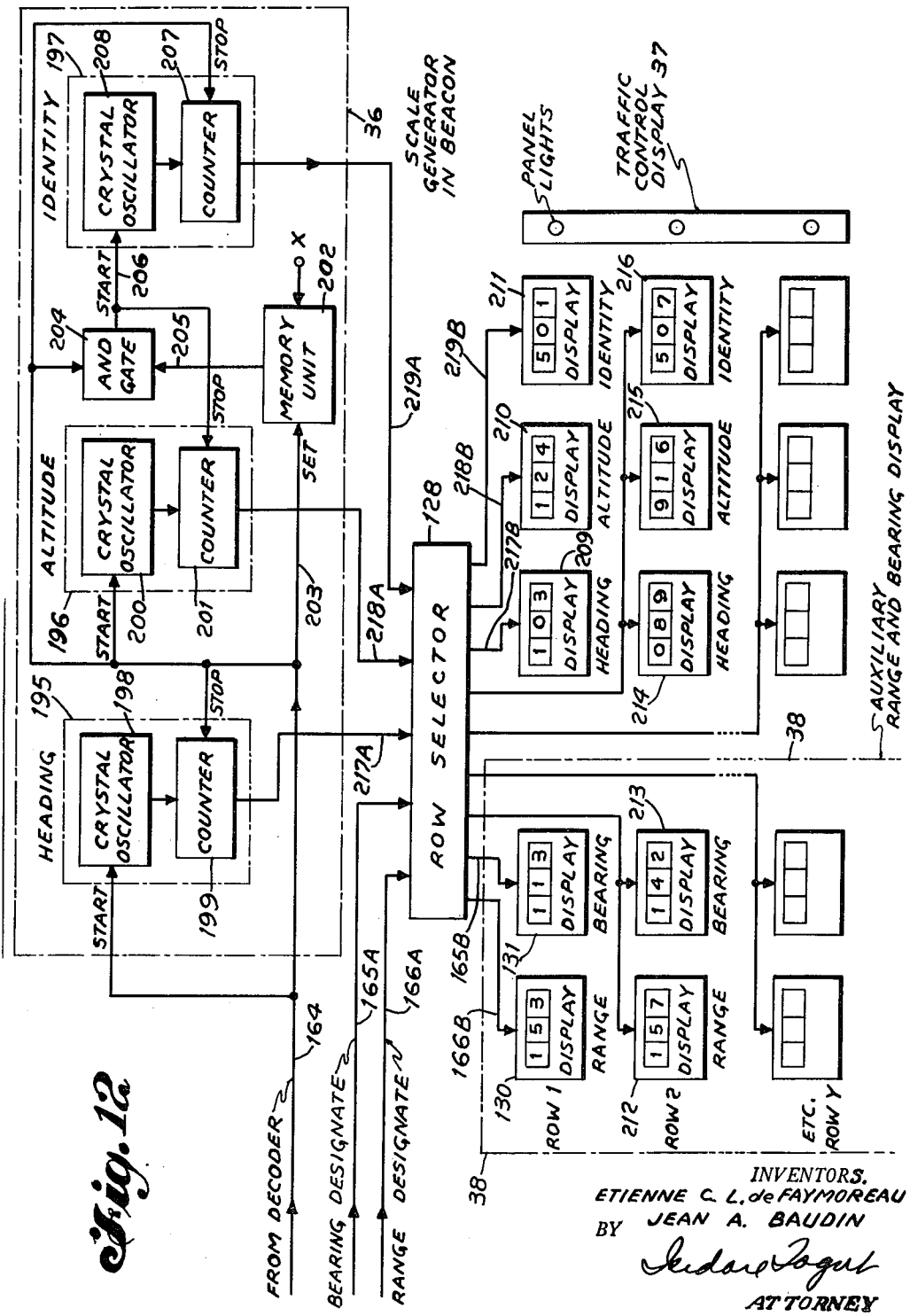

1

3,136,991
AIR TRAFFIC CONTROL SYSTEM
Etienne C. L. de Faymoreau, Nutley, and Jean A. Baudin, Montclair, N.J., assignors to International Telephone and Telegraph Corporation, Nutley, N.J., a corporation of Maryland
Filed Aug. 1, 1960, Ser. No. 46,490
12 Claims. (Cl. 343—6.5)

Our invention relates to air traffic control systems and more particularly to traffic control systems utilizing time pulse position modulation for the transmission of information between the craft and the central control point.

In the past, a number of different schemes for air traffic control have been proposed. Some of the prior art systems have utilized the principles of search radar to provide information at the ground on the range and bearing of the aircraft in the vicinity of the ground station. These systems have operated basically on the principle of radar by sending out a pulse which strikes the aircraft and is reflected and returned to the receiving antenna of the ground radar station. The information obtained in this manner is displayed in a number of ways. Such systems have several notable defects; one defect is that a great deal of extraneous noise appears in the information. This noise appears as ground reflections, as echoes from large stationary objects and multiple reflections from the same aircraft. The presence of this noise greatly hinders the correct interpretation of the data to provide an accurate picture of the traffic situation at any given time.

The prior art also contains systems of navigational aids for use on aircraft. These systems have provided the aircraft with the range and the bearing of each aircraft with respect to a central ground station. The range and bearing are available as meter readings at the aircraft. Two such systems are the well known Tacan system and the VOR-DMET type of system. These systems have been notably successful as navigational aids to the aircrafts utilizing them. However, these systems up to the present time have not been very useful for the control of traffic near an airport or a central ground point because of the fact that the information on range and bearing which is available to the aircraft is not known and is not available at the central ground station. Hence, the ground station has lacked the information necessary to make decisions and to coordinate the traffic control for the area. However, the prior art devices such as Tacan have been notable for their accuracy, their light weight, and their great suitability for use on aircraft. The Tacan and VOR systems have also been introduced into wide commercial and military use.

It is therefore an object of the present invention to provide both airborne equipment and equipment for use in the central ground beacon which will be entirely compatible with previous navigational aid systems such as Tacan and at the same time provide the equipment and information necessary to an air traffic control system.

It is another object to provide an air traffic control system utilizing time pulse position modulation to transmit information from the craft to the central ground beacon.

It is a further object to provide an air traffic control system which obtains information from the aircraft utilizing a roll call system based upon position roll call. It is still another object of our invention to provide a method suitable for use with visual displays for correcting for errors due to propagation delay in the telemetering process.

2

It is a feature of the present invention to provide an air traffic control system with a beacon and a plurality of transponders, one carried by each aircraft subject to the control system. The beacon contains apparatus for determining the position of the aircraft. The beacon also provides adjustable equipment for selecting any particular aircraft. The beacon has circuits which utilize the position of the particular selected aircraft to cause the transponder on the selected aircraft to transmit desired information.

It is another feature of the present invention to provide a plan position indicator (P.P.I.) for visual display of the traffic control pattern that is automatically corrected for errors due to propagation delay.

It is another feature of our invention to provide novel selection and gating circuits whereby the position of any aircraft is used to cause that aircraft to transmit desired information which is available at that aircraft only.

It is a further feature of the present invention to provide airborne measuring, timing, and gating circuits which provide for the automatic transmission of aircraft heading, altitude and identity in cooperation with receiving apparatus at the central ground beacon.

The above mentioned and other features and objects of this invention will become more apparent by reference to the following description taken in conjunction with the accompanying drawings, in which:

FIGURES 1A and 1B illustrate the scheme of pulse time position modulation used in the invention;

FIGURE 2 is a series of timing diagrams illustrating communication of information between a craft and a beacon;

FIGURE 3 is a block diagram showing a complete pulse time position modulation system suitable for the transmission of data from a craft to a beacon;

FIGURE 4 shows the overall block diagram of the beacon equipment for an air traffic control system;

FIGURES 5 and 5A are block diagrams showing in detail some of the beacon equipment mentioned in FIGURE 4;

FIGURE 6 is a greatly enlarged view of the waveforms required for the correction of errors due to propagation delay;

FIGURE 7 is a block diagram showing part of the airborne equipment that cooperates with the beacon equipment shown in FIGURES 4 and 5;

FIGURE 8 is a block diagram showing the rest of the airborne equipment mentioned in FIGURE 7;

FIGURE 9 is a series of timing diagrams useful in explaining the operation of FIGURES 5 and 7;

FIGURE 10 is a pulse timing diagram illustrating another scheme of pulse position modulation to send additional information between the craft and beacon;

FIGURE 11 shows the roll call controls utilized in the beacon of FIGURE 4;

FIGURE 12 is a block diagram showing in detail the scale generator and traffic control display mentioned in FIGURE 4.

Our invention utilizes pulse time position modulation to transmit information. In a pulse position modulation system the time of occurrence of a pulse with respect to some reference conveys the information. Here time is used as the reference and the length of time after a reference time at which a pulse occurs conveys the desired information. Refer to FIGURES 1A and 1B which show that the telemetering time is divided into a number of data cycles. One data cycle in particular is shown. The length of one data cycle may be chosen for convenience. Thus, there might be thirty data cycles in one second for example. For the purposes of explanation and visualization, it is convenient to think of a data cycle as occupying one second in time. But any convenient period can be chosen for one data cycle. The period of one data cycle is divided into major intervals of time N, numbered consecutively from the origin. Thus if a pulse occurs in the interval $N=n$, the value of the variable is $n$. For example, suppose it is desired to transmit the value of the temperature as a first variable for example and each major interval N of one data cycle represents one unit of temperature. If the pulse occurs in the 88th interval then the value of temperature might be 88 degrees centigrade for example. If the pulse occurs in the third interval as shown, the value of temperature would be 3 degrees centigrade, and so on. Such a scheme utilizes one pulse to transmit information concerning one variable.

FIGURES 1A and 1B show in addition that the same one pulse can be caused to perform double service by simultaneously conveying information on a second independent variable unrelated to the first variable. Each of the major intervals N is further subdivided into an equal number of subdivisions M. The same type of scheme will be used using the subdivisions M to transmit the information concerning the second independent variable such as acceleration for example. Suppose that each major division N is divided into twenty equal subdivisions M and each subdivision might represent an acceleration of 50 feet per second per second for example. Thus, if a pulse occurred in the 88th major interval ($N=88$) and in the 17th subdivision ($M=17$) of the 88th major interval M this pulse would represent the temperature 88 degrees centigrade and acceleration of 850 feet per second per second. In FIGURE 1A as shown the pulse occurs in the major interval $N=3$ representing say 3 degrees centigrade and in the fifth subdivision $M=5$ representing 250 feet per second per second in acceleration. Thus, it can be seen that by the use of a single pulse in a system of time pulse position modulation the single pulse can be made to convey information on two independent unrelated variables.

FIGURE 1B shows the same type of scheme as FIGURE 1A but utilizing a sine wave to mark off or count off, the intervals of telemetering time. In FIGURE 1B, one data cycle of telemetering time is again divided into a total of N major intervals for example a total of 405 major intervals in one data cycle might be used. Each major interval, N, is exactly equal to one complete cycle of the sine wave as shown. Thus the sine wave has a frequency of 405 cycles per one data cycle. If we think of one data cycle as occupying one second in time then the sine wave has a frequency of 405 cycles per second. Again we can transmit information concerning a first variable according to the major time interval in which the pulse occurs. The pulse will be superimposed on the sine wave. Thus, if the first variable is range for example, each interval might represent one-half mile of range, a pulse occurring in the 100th major interval of time ($N=100$) that is, during the 100th cycle of the sine wave would represent 50 miles of range. FIGURE 1B shows a pulse occurring during the 9th cycle of the since wave ($N=9$) which might represent 4½ miles of range for example. The pulse represents the same value of the first variable no matter where it occurs throughout a major interval of time, that is, no matter where it occurs during one cycle of the sine wave. Again, we can readily transmit information on a second independent variable by further subdividing each major interval N of time into a number of subdivisions M. For example, suppose that each cycle of the sine wave representing one major time interval M is subdivided into 360 equal intervals of time. We could then transmit information on a second independent variable M such as bearing for example, which would represent some aircraft's location in azimuth from a reference direction in degrees. The major time interval N is divided into 360 degrees M. Each subdivision of the sine wave will represent 1 degree in physical angle. This is a very convenient choice of values because one electrical degree of the sine wave will correspond to one mechanical degree of art representing bearing from north for example. Thus, if a pulse occurs during the 100th cycle of the sine wave at the positive peak of the sine wave, this would represent as before 50 miles in range and since the positive peak of the sine wave occurs at 90 electrical degrees, this would also represent 90 degrees in azimuth from north or a bearing of due East.

In FIGURE 1B, the pulse is shown as occurring during the ninth cycle of the sine wave at the 30th electrical degree or the 30th subdivision. This represents 4½ miles in range, and a bearing of 30 degrees from north. Thus, we can think of the information on the second variable bearing, as conveyed in the subdivisions as corresponding to the phase of the sine wave as is shown in FIGURE 1B. The phase of zero degrees represents North, and the phase of 90 degrees represents East and so on. In the scale of FIGURE 1B the subdivision corresponding to 30 degrees of bearing is somewhat exaggerated so that the occurrence of the pulse can be seen.

FIGURE 2 represents the basic situation concerning our invention. Referring to to FIGURE 3 an electronic beacon 3 is located at a central point. A craft carrying an electronic transponder 4 is located some distance away from the beacon 3. By use of independent equipment the craft has available certain data which the beacon 3 desires to be made aware of. The timing waves of FIGURE 2 illustrate the basic technique of communicating between the beacon 3 and the craft and also illustrate the technique of compensating for errors due to propagation time. In the example of FIGURES 1A and 1B, nothing was said about the way in which the time reference is actually established. Establishment of the time frame of reference is quite critical because all the information conveyed by the pulse is determined solely by the pulse location within the time frame of reference. FIGURE 3 shows a beacon 3 and a transponder 4 in craft separated by some range, or distance, for example a range of 10 units. In any physically realizable system, it will actually take a finite length of time for a pulse to travel from the beacon 3 up to the craft and for a pulse to travel from the craft back to the beacon 3. This delay due to propagation time through the transmitting medium will actually make impossible the plan of communication illustrated in FIGURES 1A and 1B unless a scheme is devised to correct for this delay.

FIGURE 2 illustrates the basic idea of the scheme of correction of the present invention. Suppose we use a system of units where 1 unit of range is represented by 1 unit of telemetering time. Then a range of 10 units for example is represented by 10 units of time on our time scale. The waveform $a$ of FIGURE 2 shows a fast time base which has 12 equal major intervals of time in one data cycle. This fast time base is the measuring stick or reference for our systems of measurements. When the beacon 3 desires to know the range of the craft, the beacon 3 will send an interrogation pulse to the craft. When the transponder 4 receives this interrogation pulse from the beacon, it will begin counting time to measure off its own range which it knows from independent equipment on the craft. Then the transponder 4 in the craft will send back a reply pulse to the beacon 3. When the beacon 3 receives this reply pulse it will note the range of the craft. The only difficulty in this scheme of communication is the error introduced by the delay in propagation between the craft and the beacon 1 and vice versa. Thus, curve $2b$ shows that the beacon 1 emits an interrogation pulse once during each data cycle. However, this interrogation pulse is not received at the craft till one unit of time later. This one unit of time represents the propagation delay from the beacon 1 to the craft as shown in curve 2c. When the craft receives the interrogation pulse, the craft begins to count time using the same scale as the fast time base curve 2a. When the craft counts 10 units corresponding to a range of 10, the craft transponder 4 transmits the reply pulse as shown in curve 2d. However, the replay pulse transmitted by the transponder 4 is not received back at the beacon 1 until one more unit of delay has gone by, corresponding to the delay on the return trip due to propagation time. Curve 2e shows that since the beacon starts counting time from the time of the transmitted interrogation pulse, 12 units of time on the fast time base have elapsed when the reply pulse is received back at the beacon. It can be seen that this measure of the range of the craft has considerable error. The true range of the craft is 10 units, but using the fast time base at the beacon the measurement reads 12 units. Thus, there are two parts in 12 error or 16% error in the measurement of range. This error was caused by the round trip delay time of 2 units. However, if times counted are measured at the beacon 3 by using a second slow time base as shown at curve 2f, this error can be eliminated.

The slow time base 2f has 10 equal units of time during one data cycle. This slow time base is synchronized with the fast time base curve 2a in that the slow time base 2f exactly coincides with the fast time base at the end of each 12 units of time at the fast time base as shown. However, each unit in the slow time base 2f is slightly delayed over the corresponding unit of the fast time base, that is, each unit of the slow time base 2f is slightly longer. Thus, at the end of 10 units as counted on the slow time base, the reply pulse received from the craft is read as 10 units of range which is the correct reading. Suppose as another example, the craft is at a range of 5 units, then the delay due to propagation will be ½ of a unit from the beacon to the craft and another ½ of a unit from the craft back to the beacon as measured on the fast time base curve 2a. Thus, for a range of 5 units the value as read on the fast time base will be 6 units of range with a 20% error. However, the value as read on the slow time base 2f will be 5 units of range which is exactly correct. It can be readily seen that the slow time base 2f will give the correct value of range for any range within the system since the delay due to the propagation time is directly proportional to range. The relationship between the fast time base and the slow time base can be readily seen by setting a straight edge vertically across the two time bases. Curve 2g of FIGURE 2 shows a voltage sweep wave form which increases from zero to a value E1 during a period of one data cycle. This sweep voltage G can be used as a method of counting time on a slow time base as will be illustrated in FIGURE 3. It will be noticed during one data cycle, we can consider time duration of this sweep as being 10 units of the slow time base. The amplitude E1 can be considered as representing 10 units of range. The sweep of curve 2g starts in synchronism with the beginning of the fast time base 2a, stops at the end of 12 units of the fast time base 2a at which time another sweep cycle starts.

FIGURE 3 shows a complete communication system for transmitting data from a craft to a beacon. The left hand side of FIGURE 3 shows the electronic equipment in a beacon 3, located at a central point. The right hand side of FIGURE 3 shows electronic equipment in a transponder 4 on the aircraft. Each craft using this system is equipped with a transponder exactly like transponder 4. FIGURE 3 shows a fast time base 5 generator which produces the basic timing pulses. Fast time base 5 causes modulator 6 to be keyed causing transmitter 7 to emit an interrogation pulse once during each data cycle as determined by the fast time base 5. The modulator 6 and the transmitter 7 can be part of the normal transmitting equipment of a Tacan installation or VOR-DMET equipment. The use of the normal existing Tacan or VOR transmitting equipment, saves equipment, but if desired a separate transmitter and modulator may be used. The portion of the equipment normally present in the Tacan or VOR systems is shown within the dotted lines of block 8 in the beacon 3 and the equipment within block 9 in the transponder 4. The fast time base 5 also has its output coupled to a scan generator 10. This scan generator 10 puts out a linear sweep waveform which is started and stopped by the fast time base 5, as shown in curve 2g in FIGURE 2 above. The output of the scan generator 10 is applied to the vertical deflection plates 11 of cathode ray tube 12. The output of the scan generator 10 could alternately be applied to the horizontal input of the cathode ray tube 12, with the same effect, except that the scale would then be read horizontally instead of vertically. As shown the vertical scale 13 of CRT 12 is marked off in terms of range and to use the example illustrated in FIGURE 2, the range scale 13 will be marked to indicate zero to 10 units of range corresponding to the time duration of the sweep of the scan generator 10. The lower position 14 of the CRT scale 13 represents the start of the scan generator sweep at the beginning of a data cycle and the top 15 of the scale 13 represents the end of the scan generator sweep and represents the maximum range, 10 units of range, for example. Scan generator 10 does not alone cause a display to appear at the cathode ray tube 12. The intensity of the electron beam of the CRT 12 is intensity modulated by modulator 16 being connected to the beam intensity input 17 of the CRT 12. The modulator 16 is controlled by the receiver 18. The receiver 18 and the modulator 16 are present in the normal Tacan or VOR beacon equipment and use may be made of this existing Tacan or VOR equipment. If desired a separate receiver and modulator may be used depending upon convenience.

The fast time base 5 generates a keying pulse once each data cycle which causes the modulator 6 to appropriately trigger the transmitter 7 and the transmitter 7 emits an interrogation pulse. This pulse, after a delay determined by the range, is received by receiver 19 in transponder 4 on the craft. The output 20 of the receiver 19 is introduced into a fast time base 21 in the transponder 4. Fast time base 21 counts time at exactly the same rate as the fast time base 5 in the beacon 3. The fast time base 21 causes a scan generator 22 to start its linear sweep. Scan generator 22 provides a sweep exactly the same as the sweep provided by scan generator 10 in the beacon 3. This sweep has the same slope and the same duration and terminates at the same voltage level E1 shown in FIGURE 2 curve g. The fast time bases 5 or 21 could be accurately timed multivibrators, for example, or a crystal controlled oscillator plus a pulse former might be used. The techniques for constructing such time bases are well known in the electronic art. There are a number of circuits which create the type of scan produced by scan generator 10 or 22. A phantastron, or a Miller sweep circuit could be used, for example. All of these techniques are well known in the electronic art. The output of scan generator 22 is introduced into one input 23 of comparison circuit 24. The equipment shown in block 9 is part of the equipment normally available on a craft equipped with Tacan type navigational equipment or VOR-DMET navigational equipment. The receiver 19 also provides an output to ranging system 25. A ranging system 25 in conjunction with the Tacan equipment provides an independent measurement of range which is available at the craft as a meter indication and it is this measurement of range which it is desired to transmit back to the beacon 3. In Tacan equipment for example, the range as measured by the Tacan equipment 9 is available as a D.C. voltage level created by the position of the wiper on a potentiometer (not shown). The position of a shaft is controlled by the range of the craft as measured independently, the shaft in turn controls the position of the wiper on the potentiometer so that the D.C. voltage at the wiper of the potentiometer represents range. The ranging system shaft and the potentiometer and power supplies are indicated in block diagram form as a counter 26. This equipment is present normally as part of the Tacan set. The receiver 19, ranging system 25, and the counter 26 are not in themselves novel but form part of the novel combinations of the present invention.

The output of the counter 26 such as the D.C. level 27 representing range is introduced into the second input 27 of the comparison circuit 24. The comparison circuit 24 provides an output at the exact instant when the rising sweep voltage of the scan generator 22 becomes exactly equal to the D.C. voltage 27 from the Tacan or VOR-DMET ranging system. The instant that the voltage of the scan generator 22 reaches the same level as the D.C. range voltage 27, the comparison circuit 24 provides an output pulse at 28 which is introduced into the modulator 29. The pulse input 28 to the modulator 29 causes the modulator 29 to key the transmitter 30, which emits a reply pulse from the transponder 4. The modulator 29 and transmitter 30 are also normally available as part of the usual Tacan or the VOR-DMET equipment on the craft. The Tacan equipment within block 9 does not in itself form the novelty of the circuit of the present invention. It can be seen that the only new equipment it was required to add to the equipment already in the craft equipped with Tacan equipment was the fast time base 21, scan generator 22, and the comparison circuit 24. The reply pulse sent from the transmitter 30 on the craft is received by the receiver 18 in the beacon. The output of the receiver 18 causes the modulator 16 to vary the intensity on the intensity input 17 of the cathode ray tube 12. Thus, the received reply pulse at the beacon 3 causes the cathode ray tube 12 to exhibit a bright spot at the instant of return of the reply pulse.

In summary, the operation of the complete system shown in FIGURE 3 can now be given. The fast time base 5 causes the modulator 6 to key transmitter 7 which sends up an interrogation pulse to the transponder 4 in the craft and at the same time the fast time base 5 starts the scan generator 10 into the linear voltage sweep which is introduced at the vertical deflection plate 11 of the cathode ray tube 12. The electron beam is moving vertically up along the range scale 13 on the CRT 12 although no spot is yet visible. When the interrogation pulse is received in the transponder 4 by receiver 19, the output 20 of the receiver 19 causes the fast time base 21 to start running. Fast time base 21 causes the scan generator 22 to start its linear sweep in synchronism with fast time base 21. When the output voltage 23 from the scan generator 22 reaches exactly the same voltage level as the D.C. voltage 27 indicating the range of the craft from the beacon, comparison circuit 24 provides an output pulse at its output 28. The output 28 causes modulator 29 to key transmitter 30 which transmitts a reply pulse from the transponder 4. After a delay corresponding to the range, a reply pulse is received by receiver 18 which causes the modulator 16 to vary the intensity of the electron beam in the cathode ray tube 12 and causes a bright spot to appear at the instant that the reply pulse is received at the beacon 3. Thus, an observer watching the cathode ray tube 12 will see a bright spot alongside the range scale 13 corresponding to the range of the transponder 4 in the craft from the beacon 3. This provides the desired measurement of range of the craft from the beacon. However, the delay in propagation from the beacon to the craft and from the craft back to the beacon does not affect the accuracy of the indication of range on the CRT 12. This is because, the range scale 13 of the cathode ray tube 12 has been marked in units appropriate to compensate for the error that would be present due to the delay in propagation. Using the example of FIGURE 2, range scale 13 will read a total of 10 units of range and the scan generator will actually sweep over a period of 12 units on the fast time base scale. The actual elapsed time from the time the interrogation pulse is sent from the beacon and time the reply pulse is received from the transponder in the craft, is the same in both cases. But the method of correction here allows propagation delay to be automatically compensated for by utilizing a fast time base in the beacon to control the transmitter and a fast time base in the transponder 4 on the craft to control the measurement of telemetering time while the beacon 3 measures range by the correct scale 13.

One more example will serve to illustrate that the technique shown in FIGURE 3 can be applied to any range measuring system of the type shown whether electromagnetic waves are used to propagate the pulse or sound waves in air, or sonar waves, for example, in water. One more example will make obvious the technique to be used for establishing the fast time base, the scale of the scan generator and the scale of the cathode ray tube. Suppose that we pick a maximum range of 1,000 miles for our system of delay compensation. Suppose also that we choose the period of one data cycle to be one second. In other words, the linear sweep such as shown in curve g of FIGURE 2 will last exactly one second. Suppose also that the amplitude of this linear sweep will be exactly 100 volts at the end of one second. That is 100 volts represents 1,000 miles in range. If we were not going to compensate the scale on the cathode ray tube 12, we would indeed mark this range scale 13 as reading 1,000 miles. However, by marking it appropriately, it will be seen that we have correctly compensated for the delay due to propagation at each and every range within our 1,000 miles maximum range capability.

To calculate the delay we note that there is a delay of 12.4 microseconds per radar mile utilizing electromagnetic radiation through the atmosphere. If we were going to calculate delay of sound pulses through the air for example we would use the delay of 1 second per 1100 feet of range for example, which is a one way delay. 12.4 microseconds actually represents a round trip delay. That is, the delay for electromagnetic radiation to travel one mile, reverse itself, and return to the point of origin. If we were going to use the system of sound waves propagated through water, we would use an appropriate delay corresponding to the speed of sound waves in water. Utilizing electromagnetic radiation, the maximum delay for the maximum range of 1,000 miles is 1,000 miles multiplied by 12.4 microseconds per radar mile or the maximum system delay is 12,400 microseconds or 12.4 milliseconds. Our tentative scale for the range scope 12 was 1,000 miles maximum range, that is, the slope of the linear scan would be 1 mile per 1 millisecond of scanning time. We can see that if when the interrogation pulse is transmitted time starts running at the beacon, at the end of one second of elapsed time a reply pulse is received, of this time of 1,000 milliseconds, 12.4 milliseconds actually represents round trip delay time and the balance represents the telemetered value of range. Hence, from 1,000 milliseconds we subtract 12.4 milliseconds, yielding 987.6 milliseconds. Thus, we mark the range scale as 987.6 miles actual maximum at the end of one second of sweep time, at the end of our range scale. We can then subdivide range scale 13 into 987.6 equal subdivisions. Each subdivision represents 1 mile in range, the range scale is now accurate and it is corrected at each point correctly for the delay due to propagation. This method can be extended to any convenient maximum range for this system and any convenient time scale and number of divisions for the range scale. All that is necessary is the calculation of the maximum delay at the maximum range of the system and an appropriate subdivision of the scale. These calculations have been tabulated in Table 1.

Table 1

System maximum range = 1000 miles
One data cycle = 1 second
One data cycle = 1000 milliseconds
Delay = 12.4 microseconds per radar mile
Maximum system delay = 1000 miles × 12.4 microseconds/radar mile
Maximum system delay = 12,400 microseconds = 12.4 milliseconds
1000 milliseconds − 12.4 milliseconds = 987.6 milliseconds
Marking of range scale = 987.6 miles
Each division on scale ≅ 1 mile.

FIGURE 3 has shown the method of transmitting information and one variable, range, between a craft 4 and a beacon 3 with automatic correction for errors due to propagation.

Referring now to FIGURE 4, which is the overall block diagram for the electronic equipment required in the beacon 31 for a system of air traffic control, FIGURE 4 is the overall block diagram of a beacon 31 which provides for the transmission of both range and bearing from the craft to the beacon 31 and in addition provides for the transmission of the heading, altitude, and identity of each craft reporting to the beacon 31. The system of FIGURE 4 is quite flexible and is designed to cooperate with existing commercial Tacan equipment or VOR-DMET equipment. One of the principal advantages is that craft which are not equipped with the improvements described in this invention can still use the ordinary Tacan equipment and receive navigational assistance from the beacon. Craft which are equipped with our invention can be readily identified, located, and controlled in an air traffic pattern by our invention. Not all of the blocks shown in FIGURE 4 need be used as some of the apparatus is only needed for particular functions and may not be required at particular installations. The functions and uses of each of the blocks shown in FIGURE 4 will be explained in detail when that piece of equipment itself is discussed. For the time being we briefly point out the equipment present in a complete beacon 31. Existing Tacan or VOR-DMET equipment is indicated in block 32 as utilized by the present invention for transmitting and receiving pulses as will be explained in detail below. FIGURE 4 shows a Time Bases and P.P.I. unit, 33. All of the input and output interconnections shown in FIGURE 4 are numbered throughout our discussion in conformity with FIGURE 4 so that the interconnections of the various pieces of equipment will be readily obvious. There is also shown a Range and Bearing Counters and Display Unit 34. Roll Call Controls 35 is shown, a Scale Generator unit 36, a Traffic Control Display 37, and an Auxiliary Range and Bearing Display Unit 38. Each of the pieces of equipment shown in FIGURE 4 have indicated thereon the figure number which shows in detail the equipment involved. For example, the Roll Call Controls 35 are shown in detail in FIGURE 11 and so on.

To understand the detailed operation of our traffic control system, refer now to FIGURES 5 and 5A. FIGURES 5 and 5A shows the Tacan equipment within the block 32. The block 33 shows the Time Bases and P.P.I. unit. There is also shown the Range and Bearing Counters and Display 34. The Tacan or VOR-DMET equipment 32 does not in itself form the novelty of the present invention. However, our invention is arranged to be compatible with and to work efficiently with existly commercial Tacan or VOR equipment as will be explained in the operation of FIGURES 5 and 5A.

Thus, the equipment provided by our invention is shown in blocks 33 and 34 in FIGURES 5 and 5A. Within the Tacan equipment 32 is shown a master timing generator 39. Present Tacan equipment is built to accommodate a wide range in the number of craft present at any given time. When the number of craft to be serviced is relatively low, master time generator 39 provides filler pulses to maintain the load on the Tacan transmitter 40 at a relatively constant value. Our invention is adapted to be controlled by the master timing generator 39 so that the interrogation and reply pulses of our invention are interleaved with normal Tacan pulses which will be present in the system at the same time. Hence, each cycle of operation of the present invention is started at an appropriate time by the master timing generator 39. The exact manner in which the time to start a cycle is chosen does not form part of the present invention. At an appropriate time the master timing generator 39 sends a starting pulse by its lead 41 to the fast time base 42 of our invention. The fast time base 42 operates at a frequency of F cycles per data cycle. For purposes of discussion, if we consider one data cycle to occupy one second in time the frequency of the fast time base is F cycles per second. The fast time base 42 may consist of a crystal oscillator and a pulse former for example. The pulse former provides a pulse once during each cycle of the sine wave of the crystal controlled oscillator, for example, when the sine wave crosses the zero axis in the positive going direction. Thus the fast time base 42 can be considered as producing F pulses per data cycle or F pulses per second.

Once during each data cycle, the fast time base 42 provides in its output lead 43 a pulse to cause the modulator 44 of the Tacan equipment 32 to key transmitter 40 to cause an interrogation pulse to be transmitted from the beacon 31. At the same time, the output 43 of the fast time base 42 causes a slow time base 45 to start running. The slow time base 45 is similar in construction to the fast time base 42 except that the slow time base 45 operates at a frequency of S cycles per data cycles or S cycles per second. The slow time base 45 may consist of a crystal controlled oscillator and a pulse former. Both the sine wave output of the slow time base 45 and the pulses formed once each cycle of the sine wave are utilized in the later equipment. The sine wave output 46 of the slow time base 45 is introduced into a phase splitter 47. The pulse output of the slow time base 45 is introduced into the range and bearing counters and display unit 34 by means of the lead 48.

Phase splitter 47 causes the sine wave output 46 of the slow time base 45 to be split into two sine wave signals 90° apart in phase; in other words, a sine and a cosine wave at the same frequency S of the slow time base signal. These two outputs which are 90° apart in phase are shown on the leads 49 and 50 which are connected to a range amplitude modulator unit 51. A range scan generator 52 is connected to the fast time base 42 and synchronized with it. The range scan generator produces a rising linear sweep voltage waveform, such as was shown at curve g in FIG. 2. This sweep output is provided at lead 53. Thus, the output 53 of the range scan generator 52 is started and stopped in synchronism with the fast time base 42. The range amplitude modulator 51 causes the two 90° out-of-phase signals 49 and 50 to be each amplitude modulated equally by the signal 53 from the range scan generator 52. The two outputs of the range amplitude modulator 51 are shown at leads 49b and 50b. These two signals are thus both at the frequency S of the slow time base 45 and are 90° out of phase and they are each equally amplitude modulated in the value of their voltage. One of these amplitude modulated signals 49b is applied to the vertical deflection plates 54 of cathode ray tube 55. The other sine wave output 50b is applied to the horizontal deflection plates 56 of the cathode ray tube 55. The effect of these two signals on the scanning beam of the cathode ray tube 55 can be readily seen. The two sine waves at the same frequency and 90° out of phase, if they were not amplitude modulated, would cause the spot on the cathode ray tube to revolve in a cycle at the frequency of the slow time base 45. When each of the sine waves is amplitude modulated equally, an increase in voltage causes the diameter of this circle to increase as the signal from the scan generator 52 is increased. Thus, the rotary motion of the spot can be thought of as corresponding to bearing or position in azimuth, and the motion of the spot outward radially can be thought of as motion in range and the spot or the beam of the cathode ray tube 55 will actually follow a spiral scanning motion from the center of this scope 55 and moving outward. The technique to produce a spiral scan is in itself not novel. However, it will be noted that as the spot moves in the spiral scan from the center to the outer range or the outer edge of the CRT 55, in the exact same time it takes the spot to move from the center of the CRT 55 to the outer edge, the spot will go through exactly S revolutions in azimuth as determined by the slow time base 45.

Within the Tacan equipment 32, there is a receiver 57. The output of the receiver 57 is coupled to an intensity modulator 58. The output 59 of modulator 58 is connected to the intensity input of the cathode ray tube 55. Thus, pulses received by the receiver 57 cause the modulator 58 to vary the intensity of the beam of the cathode ray tube 55. This causes a bright pulse or spot to appear on the face of the cathode ray tube 55 each time a pulse is received by the receiver 57. To understand the novel relationship between the fast time base, the slow time base and our display mechanisms, we turn next to FIG. 6 which shows the waveforms of the fast time base and the slow time base. Curve A of FIG. 6 shows the sine wave output of the fast time base 42. Curve B shows the slow time base 45 sine wave output 46. It is to be understood that pulses can be derived once each cycle at the point where the sine waves cross the zero axis in the positive going direction. For purposes of explanation, we need examine only the sine waves. The present invention provides an extremely judicious choice of the values of the frequencies F and S for the two time bases. Suppose the fast time base frequency F is set at 405 cycles per second, that is, 405 cycles in one data cycle, and we can consider the length of one data cycle to be one second for the purposes of explanation. We choose the frequency of the slow time base S to be equal to 404 cycles per data cycle or 404 cycles per second. This is exactly one cycle less than the frequency of the fast time base. The difference in frequency between the two time bases 42 and 45 causes the slow time base to be progressively delayed as compared to the fast time base. This delay is shown as the heavy line in Curve B. The delays for any particular cycle of the slow time base are shown as $D_1$, $D_2$, $D_n$, etc. It will be seen that at the end of the first cycle of the fast time base A, the slow time base B has not quite completed a full cycle and in fact it does not complete a full cycle until a short time later, namely, $D_1$. Again, at the end of the second cycle of the fast time base A, the slow time base B has not quite completed its second cycle and in fact it is just twice as far behind in time as it was at the end of the first cycle, this time is shown as delay $D_2$. There is thus a progressively cumulative delay accumulating on the slow time base, Curve B. The delay for any particular cycle of the slow time B is given by the formula $$Y \times \frac{1}{404} \times \frac{1}{405} = D_Y$$

where the delay is given in seconds. It will be seen at the end of 405 cycles of the fast time base, the slow time base has lost one complete cycle of the fast time base so that in the time that the fast time base completes 405 cycles, the slow time base completes 404 cycles. The two waves are then again in phase. The same process takes place in the next cycle.

To understand the utility of these particular choices of frequencies, consider the following calculations:

$$\frac{1}{405} = 2469.13 \text{ microseconds per one cycle}$$

of the fast time base

If we divide the period of one cycle of the fast time base by 12.36 microseconds per radar mile, we will have the round trip distance that a pulse can travel and return in one cycle of the fast time base.

$$\frac{2469.13 \text{ microseconds}}{12.36 \text{ microseconds}}$$

per radar mile is equal to 199.78 miles This is the maximum range of our air traffic control system. With the slow time base equal to 404 cycles per second, the time delay per cycle of the slow time base is equal to $$\frac{1}{404} \times \frac{1}{405}$$

which is 6.12 microseconds per cycle delay. The range scale of the cathode ray tube 55 (or scale 13 in FIG. 3) is then marked off to indicate a maximum range of 199.78 miles. This range or the distance on the scale is then subdivided into 404 equal units. Each unit represents approximately one-half mile, that is $$\frac{199.78}{404}$$

miles per unit. By this technique, we have automatically compensated for the time delay due to the propagation of pulses sent by the beacon 31 and received from transponders located on the craft. Utilizing such a scheme, we can actually use one reply pulse sent from the transponders in the craft to represent both range and bearing of that craft, as was explained in conjunction with FIGS. 1A and B. Thus, we allow the major intervals of time, such as shown in FIGS. 1A and 1B, to represent range and the subdivisions of time will represent the bearing of the transponder.

Before discussing the rest of the equipment shown in FIG. 5, we turn to the equipment located on board each craft using the system. This is shown in FIG. 7 as a transponder 60. The Tacan equipment normally present on board a craft is shown within the block 61. But other independent equipment may be used as well as will be understood in conjunction with our explanation. A receiver 62 responds to the interrogation pulses which are sent from the transmitter 40 of the beacon 31. The output of the receiver 62 is connected to a fast time base 63. The fast time base 63 can be exactly the same as the fast time base 42 in the beacon 31 and this fast time base 63 operates exactly at the same frequency of F cycles per data cycle as the fast time base 42. The sine wave output 64 of the fast time base 63 is introduced into a phase shifter 65. The phase shift in the output 67 introduced by the phase shifter 65 depends on the rotary position of the input shaft 66. Thus, degrees of mechanical rotation of shaft 66 result in electrical phase shift at the output 67 as compared to the input wave at 64. The mechanical input to the phase shifter 65 on the shaft 66 will be provided by the azimuth or bearing system 68 of the Tacan equipment. The normal Tacan bearing system or the bearing portion of a VOR-DMET system has available as a shaft rotation the bearing of the aircraft with respect to the beacon. This shaft rotation is introduced into the phase shifter 65 by rotating the shaft 66 of phase shifter 65. Actually, the phase shifter 65 could be mounted on the same shaft as the Tacan equipment's own azimuth phase shifter. For clarity, we have separated out the parts of our invention which must be added on board the craft. If 360° of mechanical rotation represent 360 electrical degrees of phase shift, then there is a one-to-one correspondence between the shaft rotation and the phase shift of the output of the wave 67 as compared to the input wave 64. The output sine wave 67 will be at the same frequency as the input wave 64 from the fast time base 63. The output 67 will simply be shifted ahead or behind in phase by an appropriate number of electrical degrees corresponding to the azimuth or bearing of the transponder from a reference direction which will normally be the north direction.

The phase shifted sine wave at 67 is introduced into a pulse former 69. The pulse former 69 forms pulses when the sine wave crosses the zero axis in the positive going direction, as has been mentioned in conjunction with other pulse formers in the system. Thus, a train of pulses is produced at the output 70 of the pulse former 69 which are shifted in time occurrence according to the azimuth or bearing of the transponder on the particular craft in question. Thus, crafts which are located due east of the beacon will have their sine waves shifted 90° for example or one-quarter of a cycle. The output 70 from the pulse former 69 is introduced into a conjunction organ 71. However, the AND gate 71 does not produce an output at its output 72 until the conjunction of two pulses occur at its two input leads 70 and 73. To show how a pulse input at 73 is derived so as to represent the range of the transponder, we refer to the rest of the equipment shown. The output of the receiver 62 is also connected to the trigger input 74 of a phantastron circuit 75. When the receiver 62 receives an interrogation pulse from the beacon 31, the receiver produces at that instant an output trigger 74 which starts the phantastron 75 in its time delay cycle of operation. Phantastron circuit 75 is well known in the prior art and works in the conventional manner. It does not in itself form the novelty of our present invention. The length of the delay produced by this phantastron 75 is determined by the D.C. control voltage introduced at the delay control input 76 of the phantastron 75. Normal Tacan equipment 61 has a ranging system 77 which has available a D.C. voltage which represents the range of the craft carrying the transponder from the central beacon 31. In the Tacan system, this D.C. range voltage is derived from the position of a range shaft in the ranging system. The rotation of this shaft represents range and a potentiometer and power supplies are connected to the shaft so that the position of the wiper of the potentiometer represents range. Hence, the D.C. output voltage on the wiper of the range potentiometer is a D.C. voltage scaled according to range. The scale of this range potentiometer is the same as the scale of the range scan generator 52 in the beacon 31. Thus, for example, if 200 miles is the maximum range, this may be represented by a maximum voltage of 200 volts for example so that the scale is 1 volt per 1 mile. This scale can be chosen at any convenient value. The Tacan system itself normally makes use of such a D.C. range voltage so that there is no actual need to supply an additional potentiometer coupled to the range shaft of the Tacan equipment, but rather the same range voltage of the Tacan system is used to set the delay on the phantastron.

Thus, the D.C. voltage level at the input 76 varies according to the range of the shaft with a greater range producing higher voltage which provides a longer delay before the phantastron produces an output pulse at its output terminals 78. When the phantastron has been triggered at 74 after a delay determined by the range, an output pulse is produced at the terminal 78. This output at 78 triggers a gate generator 79. The gate generator 79 provides a gate or a pulse which is of constant width and which is equal to the period of one cycle of the 405 cycle wave, for example. In other words, the length of the gate generated by gate generator 79 is 1/405 of a second in length. Thus, a gate of one cycle width is produced and located in time depending upon the range of the craft from the central beacon. This gate produced by the gate generator 79 is introduced into the other input terminal 73 of the AND gate 71. The operation of the equipment of the transponder 60 can now be readily seen. When the receiver 62 is triggered by the interrogation pulse from the beacon 31, the receiver sets the time delay of the phantastron running by the trigger at terminal 74 of the phantastron 75. At the same instant, the output pulse from the receiver 62 causes the fast time base 63 to start running and to produce a sine wave at 405 cycles frequency. This sine wave is immediately phase shifted an appropriate number of electrical degrees corresponding to the physical bearing or azimuth location of the transponder. Pulses derived from the phase shifted wave are introduced at terminal 70 into one input to the AND gate 71. When the appropriate delay corresponding to the range of the aircraft is reached, the phantastron triggers the gate generator 79 which provides a gate at the second input 73 of the AND gate 71. At the conjunction of the gate 73 and the pulse 70, the AND gate 71 produces an output reply pulse at terminal 72. Thus, this output reply pulse is positioned in time first according to range by the equipment comprising range system 77, the phantastron 75, the receiver 62 and the gate generator 79. Likewise, pulse 72 is precisely located in time to further accuracy according to bearing by the equipment comprising the bearing system 68, the fast time base 63, the receiver 62, the phase shifter 65 and the pulse former 69. Thus, this pulse at 72 is then positioned in time by both the range and bearing of the aircraft and its position in the telemetering data cycle represents both range and bearing by a single pulse produced at the output 72.

The reason for using a gate generator 79 instead of a single pulse is so that there will be a definite period representing range during which the vernier pulse or subdivision pulse 70 from the phase shifter 65 and the bearing system can occur in conjunction with the range gate 73. If a single narrow pulse were used from the ranging system phantastron 75, the range pulse at 73 would occur first at the beginning of the large major interval and the bearing pulse will not occur until some short time later representing the number of subdivisions of bearing or azimuth. Hence, there would be no actual conjunction of the two pulses representing range and bearing. For this reason, the range pulse 78 is translated into a range gate 79 so that the subdivision pulse 70 may coincide with the range gate 73. The pulse at the output 72 actually represents the reply pulse containing both range and bearing information. This reply pulse 72 is introduced into an encoder 80 which is also part of the equipment located on board the craft. For the purposes of our present discussion, we can consider the encoder doing nothing more than coupling the output pulse 72 to the input 81 of transmitter 83 as shown by the broken line connection lead 82. Thus, the pulse 72 triggers the transmitter 83 through lead 81 to cause the transmitter 83 to emit the reply pulse which is correctly located in time to represent both the range and bearing of the craft on which the transponder is carried. The encoder 80 need not be present for the functions of the systems under present discussion, and the unique use of the encoder 80 to provide additional features for our air traffic control system will be explained later.

The reply pulse sent by the transponder 60 is received at the beacon 31 by the receiver 57 which causes intensity modulator 58 to produce a pulse which forms a bright spot or pip on the face of the cathode ray tube 55 at the point corresponding to the position of the craft. The operator can determine the range and bearing of the craft by reading the bearing scale and the range scale at the pip on CRT 55. Thus, the visual display presented in the cathode ray tube 55 is actually a plan position indicator (P.P.I.). The P.P.I. type display is well known; however, the method of propagation delay compensation shown here is quite novel. Each craft equipped with transponder 60 sends in its individual reply pulse and there will be a separate pip or bright spot on the face of the display tube 55 indicating the range and the bearing of each of the craft simultaneously. Each craft responds to the same interrogation pulse sent from the beacon 31 and each craft replies with its own individual reply pulse. All of the reply pulses are correctly shown on the P.P.I. display 55. Mechanical degrees measured from north or vertical around the face of the tube represent bearing. The distance outward along a radius from the center of tube 55 represents the range of this particular craft. But the utilization of the slow time base 45 and scan generator 52 to control the visual display in the beacon 31 and the use of the fast time base 42 to control the interrogation pulses and the use of the fast time base 63 on the transponder 60 result in the elimination of the errors due to propagation delay. If no correction were made for propagation delay in the interrogation reply pulses, the information on bearing would be lost entirely because any inaccuracies in range would completely swamp out the additional subdivisions representing the bearing of the craft. P.P.I. display 55 is automatically corrected for the delays in propagation because the slow time base 45 is introducing a progressive and cumulative delay during each cycle of the spiral scan of the P.P.I. 55.

So far we have described a complete system of equipment located at beacon 31 and on an aircraft in a transponder 60 which derives a plan position indication of the traffic situation in the vicinity of the beacon. It should be noted that one of the principal advantages of this system is that crafts equipped with the normal TACAN equipment which do not carry the additional equipment of our invention may still utilize the TACAN beacon with no degradation in performance. However, these crafts will not appear upon the P.P.I. display of our invention. Another advantage is that craft equipped with the equipment of our transponder 60 may equally well utilize the normal type TACAN beacon which is not equipped with the equipment of our present invention in FIG. 5 and the TACAN indications on board the craft will still be quite correct.

There will now be described a different and alternate set of equipment located at the beacon 31 which may be used in place of the visual display equipment already described as items 52, 47, 51 and 55. Actually, this additional equipment shown within the block 34 in FIG. 5a provides the additional control and convenience intended to be normally used in addition to equipment shown within block 33. The range and bearing counters in display 34 are connected to the slow time base 45 by the lead 48 which is the pulse output lead from the slow time base 45. The output 84 of the receiver 57 is also introduced into the range and bearing counters in display 34. The equipment shown in block 34 is designed to work with and respond to reply pulses sent from the same type of equipment shown in the transponder 60 and already described. There are shown a number of counters such as 85, 86, 87, etc. These counters are all connected to the pulse output 48 of the slow time base 45. The output 48 from the slow time base 45 causes the counters 85, 86 and 87 etc. to count at the rate of S pulses per second and the counters totalize the pulses sent from the slow time base 45. The count on the counters 85, 86, 87, etc. represents the major units of telemetering time which in this case represent range. Each counter has an associated display unit such as 88, 89, and 90 suitable for visual display for reading of the counter. These visual displays might be nixie tubes or neon bulbs or a meter with a pointer and scale, for example. The output 84, of the receiver 57, is also connected to the counter 85 by lead 84a. Thus, when an interrogation pulse is sent from the beacon 31 the slow time base 45 is started operating by the fast time base 42 as before. The counter 85 is started operating by pulses from the slow time base 45 and the counter 85 totalizes units of time as measured by the slow time base 45. When the reply pulse is received by the receiver 57, the output of receiver 57 at lead 84a stops the counter 85. The reading on the counter 85 is displayed on the display device 88 and represents the range of the nearest craft which replied to the interrogation pulse sent from the beacon 31. Thus, counter 85, for example, is another way of representing the range scale to be read by an operator at the beacon.

However, the apparatus in block 34 also represents a technique for measuring the bearing as well as the range of the transponders and, in addition, the apparatus represents a method of segregating automatically the replies from various craft which may be located at a large number of different ranges and bearings. The output from the counter 85 shown at lead 91 is also connected to a subdivision generator 92. Subdivision generator 92 is essentially the same construction as the time bases 42 or 45 and may consist of, for example, crystal controlled oscillator 93 and a pulse former 94. The crystal oscillator 93 operates at B cycles per data cycle or, in this case, B cycles per second. In the example we have used with a fast time base of 405 cycles and a slow time base of 404 cycles, crystal oscillator 93 will operate with the frequency B equal to 360 times 404 or 145.440 kilocycles per second. This is because there are 360 subdivisions in each cycle of the slow time base wave of 404 cycles per second. Pulse former 94 produces 360 pulses for each cycle of the slow time base wave from generator 45. The output from the subdivision generator 92 is connected to the counter 96. The counter 96 has an associated display unit 97. The counter 96 and display unit 97 may be similar in construction to the counter 85 and display unit 88. However, the counter 96 totalizes subdivisions of the subdivision generator 92. Thus, for each one cycle of the counter 85, the counter 96 goes through 360 counts. The output of the receiver 57 is also connected to the stop input to the counter 96.

The operation of the two variable counting units composed of units 85, 88, 92, 96 and 97 can be explained as follows: When an interrogation pulse is sent from the beacon 31 the counter 85 starts totalizing units of the slow time base signal 48. Thus the instantaneous count of the counter 85 represents range. At the same time for each one count of the counter 85, the counter 96 goes through 360 counts as determined by the subdivision generator 92. Thus, the counter 96 is operating 360 times faster than the counter 85. The instantaneous count on the counter 96 represents the value of bearing of the transponder because bearing is transmitted as subdivisions of the major time units by the scheme of pulse time position communication being used. When the reply pulse is received at the beacon by receiver 57 the output of the receiver 57 stops both the counters 85 and 96 at the same instant. At that instant the range of the nearest craft is displayed on counter 85 through display 88 and the total on the counter 96 represents the bearing of that craft as displayed on display 97. There are additional bearing counters such as 98, 99, etc. and their associated display units 100, 101. The output of the subdivision generator 92 might be coupled directly to the other counters such as 98, 99 and so on. We have shown a scheme where a counter such as 86 has its own subdivision generator such as 102 whose output 103 is coupled to the counter 98. Likewise the output of the counter 87 at lead 104 is coupled to another subdivision generator 105 whose output 106 is coupled to the counter 99.

The reason for the use of separate subdivision generators will be explained in conjunction with the explanation for showing how each counting unit consisting of a range and a bearing counter and a subdivision generator is gated so as to represent the range and bearing of an individual craft. The output of receiver 57 is connected to the set input 107 of a memory unit 108. The memory unit 108 can be a bistable circuit such as a flip-flop made from transistors, tubes, magnetic cores, etc. The construction of such bistable circuits is well known in the electronic art. The output of receiver 57 is also connected to the input 109 of an AND gate 110. The output 111 of the memory unit 108 is connected to the second input of the AND gate 110. The output 112 of the AND gate 110 is connected to the stop input of the counter 98. The output 112 is also connected to the set input of the next memory unit 113. The output of receiver 57 is also connected to one input 114 of the next AND gate 115. The output of the memory unit 113 is connected to the second input 116 to the AND gate 115. The output of the AND gate 115 is connected to the stop input 118 of the counter 99, and also to the next memory unit in the same manner. The output 84 of the receiver 57 is likewise connected to the next AND gates in the same manner.

The operation of the range and bearing counter display unit 34 can be explained as follows. The first reply pulse stops the counters 85 and 96 to indicate respectively the range and bearing of the nearest craft which has responded to the interrogation pulse sent from the beacon 31. This same first reply pulse enters the set input 107 of the memory unit 108 and causes the memory unit 108 to enter the set state. In the set state, the memory unit 108 provides an output on the lead 111. In the reset state, the memory unit 108 provides no output on the lead 111. Thus, the first reply pulse also enters the AND gate 110 on the input 109, but this first reply pulse causes no output at the output 112 of AND gate 110 because at the instant the first reply pulse is received, the memory unit 108 is in the reset state. This first reply pulse puts the memory unit 108 in the set state. Thus, the first reply pulse has no effect upon the counters 86 and 98 which will be used for the second craft's reply. When the second reply pulse is received by the receiver 57 from the craft which is next farther out in range, this second reply enters one input 109 of the AND gate 110. Now, however, there is an output at the lead 111 from the memory unit 108. Thus, the second reply pulse causes an output pulse at 112 at the output of the AND gate 110. This output at 112 causes the counters 86 and 98 to be stopped at that instant of reception of the second reply pulse. The counters 86 and 98 respectively represent the range and bearing of the second craft to reply which will always be the craft which is next farther out in range due to the fact that the reply pulses will be separated by their respective propagation times determined by range. This second reply pulse also causes the memory unit 113 to be placed in the set state due to the output on the lead 112. As before, the second reply pulse had no effect on the output 117 of the AND gate 115 because at the instant of reception of the second reply pulse, the memory unit 113 was in the reset state. The second reply pulse places the memory unit 113 in the set state as explained. Thus, the third reply pulse is connected to the AND gate 115 by the input lead 114. The instant the third reply pulse is received from the third craft there is an output at the lead 116 because the memory unit 113 has already been placed in the set state by the second reply pulse at 112. Thus, at the instant of the reception of the third reply pulse, there is an output at the lead 117 of the second AND gate 115. Thus, the third reply pulse as produced at lead 117 stops the counters 87 and 99 and the readings of counters 87 and 99 represent respectively the range and the bearing of the craft third farthest removed from the beacon. The method of connection to any number of counting units can be seen from FIG. 5. A considerable number of craft up to about 120 maximum may be handled in this manner by one beacon utilizing 120 counters, such as 85, and 120 counters, such as 96. Each range counter and bearing counter have an associated memory unit and an associated AND gate unit as shown in FIGURE 5.

Thus, the range and bearing counters in display unit 34 present a display of the range and bearing of all the craft reporting to the beacon segregated by having nearest craft report on the first counter, the next farthest craft report on the next counter and so on. It should be pointed out that if the last counter in the display, such as the 120th counter for example similar to counter 85, were used to operate the subdivision generator 92 then there need be only one subdivision generator 92 and the other subdivision generators such as 102 and 105 and so on may be eliminated. We have shown the present arrangement for convenience of explanation. It can be seen that if the last range counter is used to operate the subdivision generator 92, the last range counter will only be stopped when the last craft has reported so that in the meantime the one and only subdivision generator, can be used to operate all of the bearing counters in parallel in the same manner that the slow time base 45 operates all of the range counters such as 85, 86, 87 in parallel. It can readily be seen that the unit 34 can be used as an alternate method of presenting a display which was shown on the P.P.I. display 55. However, it will be highly useful to have both of these displays particularly because the counting units 34 may be placed at remote locations or may be easily duplicated by simply running connecting leads, and particular observers, for example, the officials of one particular airline, may wish to keep track of their particular aircraft. The units 34 may also be used to form the range and bearing part of the general air traffic control display which will be explained below.

At the end of each data cycle, the operation of the equipment of FIGS. 5 and 7 starts over again in the same manner. The actual operation of the equipment might be with 30 data cycles per second so that a complete data cycle might take 1/30 of a second for example. Once each aircraft in the vicinity reports its range and bearing to the beacon, the cathode ray tube will ordinarily integrate this display by the persistence of the scope face so that flicker will be reduced. The display unit, such as 88 or 97, may also have integrating means such as capacitors to hold the previous reading until the next reading arrives and this problem presents no difficulties. The complete cycle of operation of the beacon 31 as shown in FIG. 5 and the transponder 60 shown in FIG. 7 can be visualized by reference to FIG. 9. FIG. 9 is similar to FIG. 2 and it represents the cycle of the transmission of an interrogation pulse by the beacon, the propagation delay of the interrogation pulse and the reception of the interrogation pulse at the transponder on the craft. Then the process of telemetering counting of time to transmit a reply pulse containing information on range and bearing and then the reception after another delay at the beacon of the reply pulse containing the range and bearing. FIG. 9 shows the process using sine waves and the delay as shown on a scale which more nearly approximates actual conditions when electromagnetic radiation is used. The example shown illustrates a transmission of a range of nine units or four and one-half miles and a bearing of 30° in azimuth. It should also be pointed out that the range and bearing information available on the craft need not necessarily be derived from Tacan equipment or might be derived from other independent equipment, such as an inertial navigation system on board the craft for example. In that case, an independent transmitter would be used to send the reply pulses from the transponder. The range and bearing would be supplied to the transponder equipment 60 by the inertial navigation system for example and the system would otherwise work in the same manner.

Independent instruments on the aircraft will ordinarily also have available at the craft certain other highly valuable items of information. For example, the heading of the aircraft derived from an electromagnetic or a radio compass, the altitude of the craft and the identity of the craft will be available. These three items of information can also be reported to the central beacon to form the complete basis for the control of the air traffic pattern around the beacon. The scheme of transmitting the heading, the altitude and the identity is illustrated by FIG. 10. FIG. 10 shows the reply pulse A which has been discussed in all the embodiments previously. This reply pulse A represents either the range alone or as in FIG. 5, the range and the bearing of the particular craft sending the reply pulse. For example, a range of five units and a bearing of 17° is shown in the same manner as the scheme illustrated in FIG. 1. However, second, third and fourth pulses, B, C and D, are also shown. The length of time from pulse A to the time pulse B is sent from the transponder is a measure of the heading of the aircraft. The length of time from pulse B to pulse C is a measure of the altitude of the craft. The length of time from pulse C to pulse D identifies the craft. This is again a scheme of time pulse position modulation. It should also be remembered the position in time of the reply pulse A, the range and bearing reply pulse, has been automatically corrected by the equipment shown in FIGS. 5 and 7 for the errors due to propagation delay. The correction process has been illustrated in FIGS. 2 and 9. However, the position in time of the additional reply pulses B, C and D to carry the information on heading, altitude and identity, respectively, does not need to be corrected for propagation delays because time will be measured with respect to pulse A. Time is measured from A to B, from B to C, and from C to D. Each of the pulses will experience the same delay on the return trip from the transponder 60 to the beacon 31. The equipment in the beacon will also measure time starting from reception of the reply pulse A so that there is no need for further correction due to delay problems in the information carried in pulses B, C and D. It may also be noted that pulse B could carry information on both heading and altitude for example by using the same type two variable pulse position modulation as was used with pulse A to cause pulse A to carry information on both range and bearing. The technique to cause the pulse B to carry two independent pieces of information is the same as that illustrated in FIGS. 5 and 7. The present invention discloses a still different method of causing the amount of time between the pulses A and B and the length of time between pulses B and C to carry the information on heading and altitude. For convenience a complete list of system pulses is provided in the pulse table below, which can be referred back to as the discussion progresses.

each interrogation pulse of the range and bearing of all the craft near the beacon and the equipment at the beacon continuously and automatically segregates this information to provide both a plan position indication of range and bearing and a counter display of range and bearing as has been described above. The equipment of FIG. 11, the roll call controls, shows the novel technique for selecting or designating the particular aircraft to report their heading, altitude and identity. As has been explained in detail, the equipment of FIGS. 5 and 7 make known at the beacon the precise range and bearing of all the craft reporting to the beacon and the particular method which was used to report this information to the beacon can now be used to show a unique technique for calling the roll, that is, for selecting or designating particular craft to report their additional information. When an interrogation pulse is sent up, at a known later time the particular craft will send a reply pulse to report its range and bearing. However, once the system has been in operation even a few seconds, the range and bearing of all craft are known and the range and bearing of any particular craft cannot change appreciably from one interrogation pulse to the next even at the high speeds of present day aircraft. Thus, suppose that after a particular interrogation pulse has been transmitted the beacon could cause to be transmitted another coded "roll call pulse" which would arrive at the particular craft designated at the exact instant that that particular craft was about to transmit its current reply pulse. Then the coincidence at the craft of the craft's trigger reply pulse and the reception at the craft of the roll call pulse from the beacon could be used to cause that particular selected craft to transmit information on heading, altitude and identity. The equipment in FIG. 11 performs just such a function.

The operator's controls for setting up a traffic control display and for calling the roll are shown as three buttons or switches 119, 120 and 121 and two hand wheels or dials 122 and 123. The operator reads either or both the plan position indicator 55 shown in FIG. 5 or the range and bearing counter display 34 and from these he selects a particular aircraft from which he desires to

| | Sent by | Equipment Responding | Coding of Pulse | Information |
| --- | --- | --- | --- | --- |
| 1. Interrogation Pulse | Central Beacon | All Transponders | Normal | Trigger. |
| 2. Reply Pulse | All Transponders | Central Beacon | ___do___ | Range, or Range and Bearing. |
| 3. Request Pulse | Central Beacon | Only the one designated transponder. | Special | Designate and Trigger. |
| 4. "Coded Reply Pulse" also called "A" pulse. | The one designated transponder. | Central Beacon | Same as 3 | Range and Bearing and Trigger. |
| 5. "B" pulse | ___do___ | ___do___ | ___do___ | Heading. |
| 6. "C" pulse | ___do___ | ___do___ | ___do___ | Altitude. |
| 7. {"D" pulse / "D" pulse group} | ___do___ | ___do___ | May be binary code. | Identity. |

Refer now to FIG. 11. FIGURE 11 shows the roll call controls block 35 shown in FIG. 4. Scale generator block 36 and traffic control display block 37 and the auxiliary range and bearing display block 38 of FIG. 4 are illustrated in FIG. 12. The equipment of FIGS. 11 and 12 must be added to the equipment shown in FIG. 5 to constitute a beacon system suitable for reporting the five variables of range and bearing and in addition, heading, altitude and identity as illustrated in FIG. 10. On board the craft, transponder equipment 60 is used which has in addition the encoder 80 added to it as shown in FIGS. 7 and 8. Refer now to FIG. 11. One of the most crucial problems in constructing such an air traffic control system is a technique or method for solving the problem of selecting a particular craft which will respond at a particular desired time to yield its information on the five variables desired. The present scheme already described automatically provides for continuous reporting after know its heading, its altitude and its identity. The operator then turns a hand operated range wheel 123, which is calibrated, to the same range as the range of the craft which he desired to get a report from. He does the same thing with the bearing hand wheel 122. The range hand wheel 123 through a shaft 124 operates a range counter 125. The shaft 124 connected to the range hand wheel 123 causes the range counter 125 to be set to the particular range which the operator desires, for example, 153 miles. Likewise, the bearing hand wheel 122 is connected to a shaft 126 which causes a bearing counter 127 to be set to the appropriate bearing that the operator desires. Range counter 125 and the bearing counter 127 will be located presumably in the immediate vicinity of the operator so that he may read these counters as he is entering the settings into the range and bearing hand wheels 123 and 122. The actual air traffic control display may be located at a remote location or it may be also near the operator. Presumably also, the plan position indicator 55 is located very near the operator so that he may observe the moving plan position indicator and make his selections of the particular aircraft in which he has interest. The operator has complete freedom in the choice of range and bearing. Thus, several craft at the same range but at different bearings may be readily distinguished by differences in bearing. Likewise, several craft at the same bearing may be readily distinguished by their differences in range. Two craft occurring at the same range and the same bearing is the exact event which an air traffic control system is designed to avoid.

The operator thus sets up on calibrated range and bearing hand wheels 122 and 123 the particular craft which he is interested in. The operator then pushes the Row Button 119. This Row Button 119 causes a row selector 128 to step to a clear row of counters or meters. The arrangement of a row of the traffic control display is indicated in FIG. 12. There will be five counters or meters indicating range, bearing, heading, altitude and identity. The row selector 128 can be for example a multiple level rotary switch for example. Pressing the row button 119 would cause the rotary switch to step to one point at a time. When the operator finds an appropriate clear row, he releases the button 119 and connections are made from the equipment of FIGS. 11 and 12 to that particular row. The operator may desire to change the arrangement of his display from time to time because in general the aircraft which are nearest the beacon are of most interest because they are the closest together and will have the greatest chance of collision. For this reason, the auxiliary range and bearing display unit, block 38 of FIG. 4, and shown in FIG. 12, will actually repeat the readings shown on the range counter 125 and the bearing counter 127. To enter the reading selected by the range and bearing hand wheels 123 and 122, the operator next presses the Enter Button 120. This causes an enter gate 129 to be closed to transmit the readings of the range counter 125 and the bearing counter 127 through the row selector 128 to the particular row which has been selected, for example, row 1. Then when the enter button 120 is pressed, the readings present on the counters 125 and 127 will be entered into the auxiliary range and bearing display unit 38 on counters, such as 130 and 131 for example. The actual mechanisms of the row selector 128 and the enter gate 129 do not in themselves form part of the novelty of the present invention and such devices are well known in the prior art.

Once the operator has selected a row and has caused the readings of the range counter 125 and the bearing counter 127 to be entered into the counters of that particular row, such as 130 and 131, the time is then appropriate to make the actual request to the particular craft to report its heading, altitude and identity which will be displayed in the three other counters in that particular row, such as row 1. The operator then presses the Request Button 121. To understand the operation of the rest of the circuitry, it is somewhat similar in operation to the equipment shown on the transponder 60 in FIG. 7 except that in the present case in FIG. 11, the range and bearing shafts 124 and 126 are operated by hand to allow the operator to make a selection. Connected to the shaft 124 of the range hand wheel 123 is a potentiometer 132. The wiper of the potentiometer 132 is coupled to the shaft 124 and appropriate D.C. supply voltages are connected to the two ends of the potentiometer 132. A connection from the wiper 133 of potentiometer 132 is introduced into the delay input of a phantastron 134. Thus, the D.C. voltage appearing on the wiper 133 of the potentiometer 132 represents range on the same scale of volts per mile as was utilized in the range scan generator 52 in FIG. 5 and the phantastron and range system 77 of the transponder 60. For example, 200 volts might represent 200 miles, 50 volts 50 miles and so on. The mechanical position of rotation of the range shaft 124 produces a D.C. voltage at 133 proportional to range. This D.C. voltage is used to set the length of delay of the phantastron 134 as a D.C. control voltage. The output 135 of phantastron 134 is connected to a gate generator 136. The output 137 of the gate generator 136 is connected to one input of AND gate 138. The trigger input to the phantastron to cause the phantastron to start the delay sweep which is proportional to range comes from the fast time base 42 connected at lead 139. The sine wave output 141 of the fast time base 42 is also connected to a range phase shifter 140. The input shaft to the range phase shifter 140 is the bearing shaft 126. Thus, the position of the calibrated hand wheel 122 determines the bearing setting and hence, the amount of phase shift introduced by the phase shifter 140 on the input 141 which is the fast time base sine wave. The output 142 of phase shifter 140 is a sine wave at the frequency of the fast time base 42 and shifted in phase by a number of electrical degrees corresponding to the particular bearing which it is desired to designate by the operator. A pulse former 143 provides a train of pulses which have been shifted in time according to this bearing designation. The output 144 of the pulse former 143 is connected to the other input of the AND gate 138. Thus, the output 145 of the AND gate 138 will be a pulse which occurs at the coincidence of the gate 137 provided by the gate generator 136, and the bearing pulse 144 provided by the phase shifter 141 and the pulse former 143. It should be noted thus the pulse 145 will be correctly located in time according to both the range as determined by hand wheel 123 and the bearing as determined by the hand wheel 122.

As before, the master timing generator 39 actually starts the fast time base 42 and the fast time base 42 provides the trigger input for the phantastron 134 and the sine wave input 141 for the phase shifter 140. Thus, it should be noted that the counting or measuring process performed in this designation equipment to form the gate which designates a particular craft is done on the scale of the fast time base 42 rather than on the scale of the slow time base 45. To understand why it is necessary to utilize the fast time base 42 here, the problem can be stated in this manner. The request pulse produced at the output 145 should be designed to just reach the particular craft designated at the instant that that craft will be just beginning to send a normal reply pulse in response to the previous interrogation pulse sent by the beacon. But it should be noted that the interrogation pulses are sent out at times determined by the fast time base 42 as explained previously. Thus, if in the designation equipment of FIG. 11 just explained a time measuring process is performed on the fast time base 42 scale, then both the request pulse 145 and the previous interrogation pulse will be delayed exactly an equal time due to propagation in reaching the craft. Hence, no correction is required for this delay time to cause the later request pulse 145 to reach the craft at precisely the instant that the craft is about to send a reply pulse which would carry the same range and bearing which have just been set into the range and bearing hand wheels 123 and 122. There will be a coincidence formed at the craft of reply pulse from the transponder 60 and the arrival of the request pulse 145 from the beacon 31, by means of equipment in FIG. 11.

The lead 146 from the wiper of the range potentiometer 132 is also used to set the delay of a phantastron 147. Phantastron 147 is triggered by the request pulse 145 from the AND gate 138. The output 148 of the phantastron 147 goes to the input to the modulator 58 shown in FIG. 5 to cause a bright spot or gate to appear on the P.P.I. display 55. Actually, the request pulse 145 if sent to the modulator 58 would cause a bright spot or pip on the scope close to the particular range and bearing which have been designated by the designation hand wheels 123 and 122. However, the request pulse 145 is not corrected for the round trip propagation delay and spots in the P.P.I. display 55 representing the actual craft as determined by reply pulses from the craft actually have present a round trip delay which has been corrected for by the equipment of FIG. 5 as mentioned. The purpose of the lead 148 is to allow the operator to see a moving pip or gate which can be moved around on the face of the P.P.I. scope 55 by operating the range and bearing designation hand wheels 123 and 122. The phantastron 147 puts in the proper delay correction of 12.36 microseconds per mile corresponding to a particular range in question since the delay of the phantastron 147 is also determined by the range potentiometer 132 as shown. Phantastron 147 is triggered by the request pulse 145 so that the phantastron 147 puts out a very short time later a pip or gate 148 which will appear on the P.P.I. display 55 to allow the operator to see that he has actually designated the particular craft which he is interested in and it also provides a check on the operation of the other circuits. For example, a break down in the equipment in FIG. 11 would be shown by the absence of such a gate pip or the incorrect location of the gate pip on the P.P.I. display 55.

So far the equipment in FIG. 11 has formed a request pulse the purpose of which is to make a request to a particular craft which has been designated by the operator to send a special series of three pulses containing information on heading, altitude and identity, but the pulse has not yet actually been transmitted from the beacon 31. The request button 121 is pushed by the operator after he has entered the correct settings of range and bearing on the range and bearing designation hand wheels 123 and 122. When the operator presses the request button 121, this causes a memory unit 149 to be placed in the set state. This memory unit can be a bistable circuit, for example. In the reset state, the memory unit 149 produces no output at its output terminals 150. In the set state, however, the memory unit 149 produces an output at the lead 150 which is connected to AND gate 151. The request pulse 145 is connected to the lead 152, the other input to the AND gate 151. The output of the AND gate 151 is connected at 153 to a coder 154. The output 153 is also connected to the reset terminal 155 of the memory unit 149. Output 156 of the coder 154 goes to transmitter 40 of the beacon 31. The operation of the designate portion of FIG. 11 is as follows. When the operator presses the request button 121, memory unit 149 is placed in the set state providing AND gate 151 with one input at lead 150. At an appropriate time determined by the fast time base 42, the fast time base provides a trigger at lead 139 to cause the range phantastron 134 to start running. At the same time, sine wave output 141 from the fast time base 42 is introduced into the phase shifter 140. The AND gate 131 detects the coincidence of a range gate from the range designate equipment 132, 134, 136 and the bearing pulse 144 from the bearing designate equipment 140 and 143. Thus, request pulse 145 is formed and correctly placed in time to carry information on both range and bearing and to also account for propagation delay from the beacon to the transponder. Request pulse 145 now produces an output pulse 153 at the output of the AND gate 151 because the memory unit 149 is in the set state. Until the operator presses the request button 121, the memory unit 149 will be in the reset state and not allow the AND gate 151 to operate. As soon as request 153 is produced it causes the memory unit 149 to be reset by lead 155. Hence, a request takes place when and only when the operator has pressed the request button 121. The actual time of occurrence of the request pulse is determined by the fast time base and the settings of the range and bearing designate hand wheels 123 and 122.

A request pulse at 153 triggers the coder 154 which sends a coded pulse 156 to the transmitter 40. It is necessary to use a coded pulse to send a request pulse from the beacon 31 to enable the transponder 60 on the craft to recognize that this is a request pulse and not an ordinary interrogation pulse from the beacon. The request pulse 156 has been specially determined or coded in two respects. First, it is specially and correctly placed in time to designate only one particular aircraft by coincidence at that aircraft at the time of a normal reply pulse from the craft. At the same time this pulse has been specially coded. In the Tacan equipment, the method of coding is to use pulses which have different effective widths. For example, normal interrogation pulses might be 12 microseconds wide and the request pulse might be 18 microseconds wide. In the Tacan also, a pair of twin pulses are often used instead of one wide pulse. The first of the twin pulses marks the leading edge and the second of the twin pulses marks the trailing edge which effectively produces a pulse width determined by the spacing of the twin pulse pair. Either technique may be used here with equal facility. The use of a coder such as 154 to produce such a separated pair of twin pulses are well known in the prior art.

The roll call controls of FIG. 11 have another function to perform. The scale generator 36 shown in FIG. 12 and the traffic control display 37 of FIG. 12 must be set up or put in condition to receive the specially coded reply pulse "A" which the transponder 60 will transmit in response to the specially coded request pulse sent from the beacon 31. FIG. 11 shows a memory unit 157, an AND gate 158 and a decoder 159. The set input 160 of the memory unit 157 is connected to the request pulse terminal 153 so that the memory unit 157 is placed in the set state when the request pulse 153 is sent to the coder and transmitted. When the memory unit 157 is in the set state, there is an output on the lead 161 of the memory unit. When the memory unit 157 is in the reset state, there is no output on the lead 161. The output of the receiver 57 in FIG. 5 is also coupled to the input of decoder 159 by the lead 162. Thus, at the instant that the roll call controls of FIG. 11 send out a specially coded request pulse at 153 or 156, the pulse at 153 places the memory unit 157 in the set state so that the AND gate 158 has one input present at 161. The output 163 of the decoder 159 is coupled to the other input to the AND gate 158. When the specially coded reply pulses from the transponder is received at the beacon 31 in response to the specially coded request pulse sent from the beacon, the decoder 159 detects and decodes this pulse. The decoder 159 will produce an output at 163 only for the specially coded reply pulses. The same coding for the reply pulse can be used as was used for the request pulse 153. For example, the width of the pulse may be a particular value, for example, 18 microseconds or a twin pulse pair of a particular separation might be used. When the receiver produces a specially coded reply pulse, the decoder 159 produces an output at 163. The AND gate 158 then produces an output pulse at its output terminal 164 because there will be an input present at both terminals 161 and 163.

The output of the AND gate 158 in the roll call controls 35 are sent to the scale generator 36 by the lead 164. Thus, there will be a series of four pulses produced on the lead 164 after each request pulse is sent at 153. These four pulses will be a specially coded reply pulse A in FIG. 10 and the three pulses B, C and D for the heading, the altitude and the identity of the responding aircraft. Designate readings on the range and bearing counters 125 and 127 are sent to auxiliary range and bearing display 38 means of the leads 166A and 165A which pass through the row selector 128 and continue as leads 166B and 165B. The decoding and gating units just described are necessary so that the scale generator 36 in FIG. 12 and the range and bearing displays 38 and 37 will not respond to the ordinary reply pulses which are returning from the craft. In general, at the same time that a specially coded reply pulse and a series of three information pulses are returning from the designated transponder, the transponder in the other craft will be sending their normal reply pulses in response to the last previous normal interrogation pulse. Thus there is no interruption in the P.P.I. data.

To briefly summarize the operation of the roll call controls in FIG. 11, the operator first enters the range and the bearing by the hand wheels 122 and 123 of the craft which he desires to designate or to gate to send this special information reply. The operator then presses the row selector button 119 to select a clear row for the display of the information from this particular craft. When the row selector stops on an empty row, which the operator desires, he releases the row button 119 and presses the enter button 120. This causes the readings of range and bearing from the counters 125 and 127 to be entered in the auxiliary range and bearing display 38, as shown in FIG. 12. The operator then presses the request button 121. This causes, under the control of the fast time base 42, the gating equipment shown in FIG. 11 to send out a specially gated request pulse in the correct time relationship so that it will arrive at that particular craft at that one range and bearing just at the instant that that craft is about to send in a regular reply pulse. This request pulse at 153 or 156 is a specially coded pulse which causes the transmitter 40 to send a specially coded request pulse of special width or some other characteristic, for example, also a special carrier frequency. When the craft receives this request pulse, the craft detects this pulse in a special manner to be described below. At an appropriate time the craft will send a series of four specially coded reply pulses, such as A, B, C and D, as shown in FIG. 10. These pulses are each received from the receiver 57 at the lead 162 and passed through to decoder 159 and the AND gate 158 and from there to the scale generator unit 36 in FIG. 12 by means of the lead 164. Thus, the equipment in FIG. 11 allows the operator complete freedom to select craft at any particular range and bearing and to designate them and cause them to respond in a special manner. The operator can continue in this manner and select any number of craft he desires by changing the position of the hand wheels 123 and 122 and going through the cycle of operation just described. The responses from other craft will be entered on other additional free rows of the display shown in FIG. 12.

Next, the additional equipment in the transponder 60 to cause it to respond to the specially coded request pulse sent from the beacon 31 will be considered. Refer again to the transponder 60 in FIG. 7. In the discussion of FIG. 7 above, it was pointed out that the encoder 80 would be used if it was desired to transmit heading, altitude and identity or some other independent variables back to the beacon 31. The encoder 80 is shown in detail in FIG. 8. In FIG. 7 are shown independent equipment or instruments carried on board the craft, such as a heading compass 165, an altimeter 166, identity system 167. The heading compass 165 may be a radio compass or an inertial navigation compass that gives the heading of the craft with respect to some particular point or destination which may not necessarily be the beacon itself. The altimeter 166 provides the altitude of the craft above the ground and the identity system 167 provides coded information concerning the identity or number of the particular craft. Instruments 165, 166 and 167 do not in themselves form part of the novelty of the present invention. The outputs containing D.C. voltage information on heading, altitude and identity are connected to the encoder 80 by the leads 168, 169 and 170. The output of the receiver 62 is also coupled by lead 171 to the encoder 80. The normally coded interrogation pulses also appear upon the lead 171 but a decoder within the encoder 80 does not allow this pulse to trigger the operation of the encoder 80. However, when one of the specially coded request pulses is received by the receiver 62, a specially coded pulse appears on the lead 171 to the encoder.

Refer now to FIG. 8 which shows the details of the encoder 80. The basic object of the encoder 80 shown in FIG. 8 is to send the specially coded reply pulse A and the following three pulses B, C and D to transmit the information on heading, altitude and identity back to the beacon 31. To understand the operation of the encoder 80, we can review briefly what happends when a normal interrogation pulse is received by the transponder 60. In FIG. 7, the dotted connection 82 was used to show that if additional information is not desired, the reply pulse produced at 72 is simply sent to the transmitter by the lead 81. However, FIG. 8 shows in detail the actual path 82 when the actual encoder 80 is used with the equipment. A reply pulse at 72 with information concerning range and bearing enters the encoder 80 on lead 72. When no request pulse from the beacon is present under normal conditions, this reply pulse 72 enters a blanking gate 172 by lead 173. Under normal conditions, this reply pulse enters a blanking gate 172 by means of the input lead 173. Under normal conditions, this blanking gate 172 merely passes the reply pulse from 72 through to the OR gate 174 by means of the output lead 175. Thus, reply pulse on lead 72 passes through the blanking gate 172 out through the OR gate 174 and to the transmitter 83 via lead 81. However, when a specially coded request pulse is sent to the transponder 60, the operation is somewhat different. It is to be also remembered that the reply pulse at lead 72 is a pulse that has been generated internally by the transponder equipment 60 to send back information concerning the range and bearing of the craft. The time of occurrence of this reply pulse at lead 72 is measured basically from the time of reception of the interrogation pulse at the transponder 60 by the receiver 62. However, when a specially coded request pulse arrives at the transponder 60 the operation of the encoder 80 is as follows. The specially coded output of the receiver 62 is sent to a decoder unit 176 via the lead 171. This decoder is the same in construction as the decoder 159 shown in FIG. 11, and it responds only to the specially coded request pulses sent from the beacon 31, for example, pulses with a special width or a twin pulse pair with a definite pulse separation such as 18 microseconds, for example. It should be noted that at the same instant the request pulse is appearing on the lead 171 from the receiver 62, the reply pulse formed by the transponder 60 in response to the previous interrogation pulse is also occurring at exactly the same time at lead 72. The output 177 of the decoder 176 is sent to a bistable circuit 178 which can be, for example, a so-called "one shot" multivibrator or a monostable multivibrator. The output 179 of the one shot multivibrator 178 is introduced into the controlling trigger input of the blanking gate 172 so that the reply pulse 72 on lead 173 is not permitted to pass to the output 175 of the blanking gate 172. Thus, the first result of the coincidence in time of the request pulse from the beacon at 171 and the reply pulse at 72 formed by the transponder 60 is to cause the blanking gate 172 to stop the transmission of the normal reply pulse from lead 72 to the transmitter 83. Methods of constructing a blanking gate, such as 172, are well known to the electronic art, and it may be built using vacuum tubes or diode gating or by other means and it does not in itself form the novelty of the present invention.

However, the output at 180 of the decoder 176 is sent to one input of the AND gate 181. Also, at the same instant the same reply pulse that was blocked at terminal 173 is sent by lead 182 to the second input to the AND gate 181. As has been mentioned, there is an actual coincidence in time of the generation of the reply pulse 72 due to the last previous interrogation pulse and the arrival of the request pulse as shown at lead 171 at the transponder 60. This is because at the beacon 31, the roll call controls in FIG. 11 are actually measuring time on the fast time base from the previous interrogation pulse. The delay of the interrogation pulse and the delay of the request pulse are exactly the same. The time difference between the interrogation pulse from the beacon 31 and the later request pulse from the beacon 31 is exactly equal to the range and bearing of the particular craft which is designated. This range and bearing are expressed by our telemetering scheme in the exact length of time as measured from the reception of the interrogation pulse at the transponder to the generation of the reply pulse at the transponder is shown at output 72. Thus, there is an exact coincidence in time of the pulse from the decoder at input 180 and a normal reply pulse at lead 72 is shown at input 182 to the AND gate 181.

The output 183 of the AND gate 181 is sent by lead 183B to the OR gate 184. The OR gate 184 passes the reply pulse through to its output 185 and thence to a coder 186. The output 187 of the coder 186 enters another input of the OR gate 174. Thus, it can be seen that at the exact instant that a normal reply pulse would be sent, the coincidence of the request pulse from the beacon and the reply pulse generated in the transponder 60 passes through the AND gate 181 through the OR gate 184 to trigger the coder 186 to produce an input at 187 to the OR gate 174. The output of the OR gate 174 goes by lead 81 to the transmitter except now the output of the OR gate 174 is a coded pulse, that is, a coded reply pulse "A" which has a special characteristic such as width or the separation of a twin pulse pair. Thus, the equipment in the roll call controls, FIG. 11, such as the decoder 159 and the AND gate 158, will be in a position to respond to this specially coded series of pulses shown in FIG. 10 as the pulses A, B, C and D. The pulse we have just described is the pulse A which has been specially coded by the coincidence of the request pulse and the reply pulse.

To review, the normal reply pulse in response to an interrogation pulse passes through the lead 72 to the blanking gate 172 through the OR gate 174 and thence to the transmitter 83. But this normal reply pulse is not coded in the same way due to the fact that it did not pass through the OR gate 184 and the coder 186. The coincidence pulse 183 which has just created a coded reply pulse at the same instant in time that a normal reply pulse would be sent except that the coding has been performed by the coincidence of the request pulse and the reply pulse, is also sent by lead 188 at the same instant to a heading phantastron 189. This coding reply pulse 188 triggers the heading phantastron 189 to start the phantastron 189 in its delay cycle. The length of delay of the phantastron 189 is set by the D.C. control voltage on the lead 168 as created by the heading compass 165. This may be done by means of a shaft and a potentiometer to create the D.C. voltage 168, the shaft of the potentiometer coupled to the heading compass shaft or it may be done by a synchro system and a demodulator or in many other ways well known in the art. Phantastron 189 will actually create the length of time between pulse A and pulse B which represents the value of heading. At an appropriate time corresponding to the heading, the end of the phantastron's sweep causes the trailing edge of the phantastron sweep to create trigger pulse to be sent to the altitude phantastron 190 by the output lead 191. At the same time, the pulse from the heading phantastron on the lead 191 is sent through the OR gate 184 through the coder 186 through the OR gate 174 to the transmitter 83 by lead 81. This creates the coded reply pulse B which is coded in the same way as the reply pulse A. The length of time between the pulse A and the pulse B carries the information concerning heading by the use of pulse position modulation, as explained in connection with FIG. 1 and FIG. 10. It should be noted that since time between pulse A and B will be measured with respect to pulse A, no problem involving delay times occurs because the delay experienced by pulse A is the same as the delay experienced by pulse B, both pulses traveling from craft to beacon 31.

At the same instant that the output of the phantastron 189 is sent to the OR gate 184, this same output is sent by lead 191 to the trigger input of the next, altitude phantastron 190. Thus, the sending of pulse B triggers the altitude phantastron 190 into its delay cycle. The length of delay for the altitude phantastron 190 is set by the altimeter 166 as controled by the D.C. voltage on lead 169 similar to the production of control by the heading compass 165 and D.C. voltage on lead 168. Phantastron 190 sets the length of time between pulses B and C. This length of time represents the value of the altitude in appropriate units. For example, 200 microseconds of the delay between pulse B and C might represent 20,000 feet of altitude since the scale would be one microsecond for 100 feet of altitude. Any appropriate scale can be used. The scale between pulse A and B is similarly determined in an independent manner. It should be noted that the telemetering scale of the time between pulses A and B is independent of the scale between pulses B and C. The scale of both times A—B and B—C are independent of the scale used from the interrogation pulse to the occurrence of pulse A. It may also be pointed out, this invention shows one particular way of coding these pulses. Using the technique shown in FIGS. 7 and 5, pulse B could be made to carry information on both heading and altitude by using major intervals of time and subdivisions of the major intervals as was done with pulse A.

When the phantastron 190 reaches the end of its delay cycle, the trailing edge of the phantastron sweep produces a pulse at the output 192 which is sent through the OR gate 184, the coder 186 and the OR gate 174 to the transmitter 83 by lead 81. This causes the transmitter 83 to send coded pulse C. At the same time the output of the phantastron 190 is sent by lead 192 to the trigger input of identity coder 193. The identity coder 193 can be a phantastron the same as 189 and 190, or it may be a binary keying device to send out a short group of very closely spaced binary pulses as determined by the identity system 167 and the control voltage on lead 170. The present Tacan equipment actually sends a short burst of binary coded characters to identify the aircraft and the identity coder 193 can work in a similar manner. The output 194 of the identity coder 193 transmits the D pulse or identity pulse group through the OR gate 184 through the coder 186 through the OR gate 174 to the transmitter by lead 81. If a short group of binary pulses is used, several short pulses will be transmitted at the output 194. Thus, the equipment shown in the encoder 80 in FIG. 8 in conjunction with the equipment shown in FIG. 7 provides the group of specially coded reply pulses in response to the specially coded request pulse sent from the beacon 31. It can be seen that the encoder 80 need not be added to the equipment shown in FIG. 7 if it is not desired to have the craft possess the ability to respond to the special request pulses, and the equipment in FIG. 7 works without the equipment shown in FIG. 8.

It is also instructive to consider the situation at some other craft which is not at the particular range and bearing designated by the roll call controls of FIG. 11. The encoder 80 of such a different craft will also receive the specially coded request pulse from the beacon 31. However, there will in general be no coincidence in time between this request pulse which is intended for the aircraft that responded and the reply pulse generated at this different craft because the reply pulse at this different craft is coded in time to represent the correct range and bearing of that particular craft and this range and bearing will be different from the length of time between the interrogation pulse and the specially coded request pulse "A" sent from the beacon 31. Hence, the decoder 176 will decode the pulse and produce an output at lead 180 but there will be no output at the output 183 of the AND gate 181 because there will be no coincidence of a reply pulse on lead 182. Also, crafts not designated by the roll call equipment in FIG. 11 will send in their normal reply pulse containing range and bearing in the uncoded state just as they normally would and the request pulse will have no effect on craft not designated by the roll call controls. Thus, the roll call controls single out one particular craft at a particular range and bearing and causes this craft to send in the desired information on altitude, heading and identity. Note that two craft at different bearing and the same range can be readily separated by the roll call controls because the bearing provides an additional small time difference between the time of occurrences of the reply pulses from the two craft. Note also that craft at the same bearing and at different range have reply pulses that occur at quite different times due to the fact that the major division is selected by range. Thus, there is no possibility that the wrong craft will be triggered by the request pulse from the beacon. The type of roll call system which is created by the equipment of FIG. 11 and FIGS. 7 and 8 is called a position roll call system because it utilizes the knowledge reported on the position, that is, the range and the bearing of the craft which is designated to cause that particular craft to respond to the roll call, hence the name position roll call.

Now the equipment shown in FIG. 12 will process the series of four pulses A, B, C, D received from the transponder in response to the reply pulse. FIG. 12 shows the scale generator unit 36. Within the scale generator unit 36 is a heading unit 195, an altitude unit 196 and an identity unit 197. The heading unit 195 may consist of a crystal oscillator 198 and a counter 199. The counter 199 totalizes cycles of the crystal oscillator 198. For example, counter 199 is started by the pulse A. When the specially coded reply pulse A is received by the receiver 57 at the beacon 31 the pulse is sent to the decoder by lead 162 and through the AND gate 158. When the specially coded reply pulse A is received at the beacon, it passes through the decoder 159 and through the AND gate 158 then by lead 164 it passes to the heading unit 195 starting the crystal oscilaltor 198 running. Crystal oscillator 198 will operate at a frequency appropriate for the scale used on the heading phantastron 189 in the equipment shown in FIG. 8. For example, suppose the heading is to be measured on the scale 360 microseconds delay to represent 360 mechanical degrees of heading. Then if the crystal oscillator 198 operates at one megacycle, at the end of 360 microseconds the counter 199 will have totalized 360 cycles or a count of 360. When the specially coded pulse B is received, it passes through the decoder 159 and AND gate 158 as before and stops the counter 199. The total on the counter 199 represents the correct value of the heading on the particular scale which has been chosen. It will be noted, the heading unit is started by the reply pulse A and the counter is stopped by the reply pulse B. Hence, no problems of round trip delay are involved because the pulses A, B, C and D are all equally delayed.

In the same manner, the altitude unit 196 has its crystal oscillator 200 started by the specially coded reply pulse B. The altitude counter 201 totalizes cycles of the crystal oscillator 200. The reply pulse B also causes the memory unit 202 to be placed in the set state by the input on lead 203. Thus, when the pulse C arrives, memory unit 202 is already in the set state and the pulse C provides the second input to an AND gate 204 and the memory unit 202 provides the other input at lead 205. Thus, the pulse C causes an output at the output of the AND gate 204 on lead 206 which starts the identity unit 197 running. At the same time, the output 206 of the AND gate 204 causes the altitude counter 201 to be stopped by the C pulse. The identity pulse D causes the identity counter 207 to be stopped. Identity counter 207 totalizes units produced by the identity crystal oscillator 208. Thus, at the end of the D pulses, the counters 199, 201 and 207 read respectively the value of heading, altitude and the identity of the aircraft which has reported.

The values of the counters 199, 201 and 207 are sent through the row selector 128 which is simply a switching unit 128 to three appropriate display counters 209, 210 and 211 in a traffic control display unit 37 in the same row as was selected for the range and bearing displays on counters 130 and 131. By utilizing a switching device, such as the row selector 128, one scale generator 36 can be made to successively service each row of the traffic and control display 37 shown in FIG. 12. Thus, the equipment we have shown and described has presented in a row of counters or display devices, such as 130, 131, 209, 210 and 211, all the information necessary for air traffic control of aircraft in the vicinity of the beacon. Namely, the range, the bearing, the heading, the altitude and the identity of particular designated craft have been shown. In the same manner each craft shown on the P.P.I. display 55 in FIG. 5 may be designated and the information obtained on its heading, altitude and identity, obtained and this data may be displayed in the equipment shown in FIG. 12. It is not absolutely necessary to have the auxiliary range and bearing unit 38 since the equipment shown in block 34 of FIG. 5 has already presented this information. But for convenience and for control in plotting at remote points, it may be desirable to have the range and bearing also available along side of the heading, altitude and identity. Other rows of suitable display counters, such as 212, 213, 214, 215 and 216 and so on should also be present so that the information on each aircraft may be entered.

While we have described above the principles of our invention in connection with specific apparatus, it is to be clearly understood that this description is made only by way of illumination and not as a limitation to the scope of our invention as set forth in the objects thereof and in the accompanying claims.

We claim:

1. An air traffic control system comprising a beacon and a plurality of transponders, one carried by each aircraft subject to said control system and adapted to determine the position of said aircraft from signals transmitted by said beacon, means carried by said aircraft to transmit return signals to said beacon, means carried by said aircraft to modulate said return signals with signals indicating the position of said aircraft with respect to said beacon, said beacon comprising means for determining the position information of said aircraft from said signals transmitted from said aircraft and free from the errors due to propagation delay of said transponder signals, means for selecting a desired aircraft and means coupled to said selecting means and utilizing the position information of said selected aircraft to transmit said position information to cause the transponder of said selected aircraft to transmit other desired information.

2. An air traffic control system comprising a beacon and a plurality of transponders, one carried by each aircraft subject to said control system and adapted to determine the position of said aircraft from signals transmitted by said beacon, means carried by said aircraft to transmit return signals to said beacon, means carried by said aircraft to modulate said return signals with signals indicating the position of said aircraft with respect to said beacon, said beacon comprising means to cause each said transponder to transmit first signals containing position information, visual display means responsive to said first signals to present said position information free from the errors due to propagation delay of said first signals, means coupled to said selecting means and utilizing the position information of said selected aircraft to transmit said position information to cause the transponder of said selected aircraft to transmit further desired information.

3. An air traffic control system comprising a central beacon and a plurality of transponders, one carried on each aircraft subject to said control system and adapted to determine the position of said aircraft from signals transmitted by said beacon, means carried by said aircraft to transmit return signals to said beacon, means carried by said aircraft to modulate said return signals with signals indicating the position of said aircraft with respect to said beacon, said system comprising first beacon means for transmitting first pulses to trigger said transponders to transmit second pulses containing position information, beacon receiver means responsive to said second pulses, beacon means for selecting a desired aircraft, beacon means utilizing the position information of said desired aircraft to transmit third pulses embodying said position information to trigger the transponder of aircraft and transponder means responsive to said third pulses to transmit additional pulses representing further information regarding the attitude of said aircraft.

4. An air traffic control system comprising a centrally located beacon and, at least one remotely located transponder, one of said transponders disposed on each aircraft subject to said control system and adapted to determine the position of said aircraft from signals transmitted by said beacon, means in said transponders to transmit return signals to said beacon, means carried by said aircraft to modulate said return signals with signals indicating the position of said aircraft with respect to said beacon, said beacon comprising first means for transmitting first pulses at predetermined times to trigger said transponder to transmit second pulses containing information, a receiver responsive to said second pulses, means coupled to said receiver, for visual display of said information contained in said second pulses, selective means coupled to said transmitting means and utilizing information in said second pulses for designating any particular transponder to cause said transmitter to transmit third pulses to trigger said particular transponder to send other pulses containing additional information concerning said designated transponder, and means responsive to and coupled to said receiver to indicate the additional information contained in said other pulses.

5. A system for air traffic control comprising a centrally located beacon and a plurality of remotely located transponders, one transponder located on each aircraft subject to said control system, said beacon comprising first means for generating a first signal at a first frequency, transmitting means coupled to said first means to transmit first pulses at predetermined times to cause said transponders to transmit second pulses containing information on range and bearing of said transponders with respect to said beacon, second means for generating a second signal at a slower frequency than said first signal, sweep generating means, means coupling the output of said second means to said sweep generating means, scan generating means synchronized to said first means and coupled to said sweep generating means, means for providing visual display of the position information of said plurality of transponders, means coupling said visual display means to said sweep generating means, a receiver responsive to said second pulses coupled to said visual display means whereby information on range and bearing of said transponders are visually displayed free from errors due to the propagation time of said first and second pulses.

6. In a system of air traffic control with a centrally located beacon and a plurality of remotely located transponders, one carried on each aircraft subject to said control system, a transponder comprising a receiver responsive to first pulses transmitted from said centrally located beacon, means for generating a first timing signal, means responsive to the bearing of said transponder from said beacon to alter the characteristic of said first timing signal, a conjunction organ coupled to the output of said means for altering the characteristic of said first timing signal, delay generating means coupled to the output of said receiver and responsive to the range of said transponder from said beacon, means coupling the output of said delay means to the input of said conjunction organ, and a transmitter coupled to the output of said conjunction organ to send pulses at predetermined times determined by the values of range and bearing of said transponder.

7. An air traffic control system comprising a beacon and a plurality of transponders, said beacon comprising first transmitting means for sending interrogation pulses, visual display means operating at a first rate synchronized to said first transmitting means and responsive to reply pulses from said transponders, each said transponder comprising transponder time measuring means operating at a different rate from said first rate and responsive to said interrogation pulses, second transmitting means controlled by said transponder time measuring means for sending said reply pulses containing information of the position of said transponder whereby said position information contained in said reply pulses is visually displayed on said beacon display means free from the errors due to propagation time of said interrogation and reply pulses, means for selecting a desired transponder from said plurality of transponders means utilizing said position information of said desired transponder for transmitting request pulses containing said position information, said desired transponder comprising means selectively responsive to the position information of said third pulses, and second transmitting means coupled to said selectively responsive means for transmitting additional pulses containing information concerning said desired transponder.

8. A data transmission system utilizing pulse position modulation comprising a central station and a plurality of substations remotely located, said central station comprising first means for sending first pulses to trigger all said substations to transmit second pulses containing desired information, central means responsive to said second pulses and adapted to transmit third pulses containing said desired information, each said substation comprising means responsive to said third pulses for responding to said third pulses containing said desired information of said substation, and substation means coupled to said responsive means for transmitting additional pulses containing further information concerning said substation.

9. Apparatus for selectively triggering any one of a plurality of transponders whose location is known relative said apparatus comprising means for selecting a desired transponder, means coupled to said selecting means and utilizing the known location relative said apparatus of said desired transponder to transmit two pulses whose separation is proportionate to said known position of said desired transponder relative said apparatus, said separation being the total of major time intervals indicative of the range of said transponder of said apparatus and the total of the subdivisions of a major time interval indicating the bearing of said transponder relative said apparatus, said desired transponder comprising selective means responsive to both said pulses to cause only said desired transponder to transmit additional pulses.

10. A system for selectively gating one of a plurality of transponders whose location is known comprising a central beacon and a plurality of transponders at known locations relative said beacon, said beacon comprising means for selecting a desired transponder, means coupled to said selecting means for generating a pair of pulses whose separation is determined by said location of said desired transponder, said separation being the total of major time intervals indicative of the range of said transponder from said central beacon and the total of the subdivisions of a major time interval indicating the bearing of said transponder relative said beacon, means for transmitting said pair of pulses, said transponders comprising means responsive to said pair of pulses and means coupled to said responsive means and controlled by said location of said transponder to produce an output at times controlled by the position of said desired transponder.

11. Apparatus for selectively energizing any one of a plurality of transponders comprising a central beacon and a plurality of transponders at known locations said beacon comprising means for transmitting pulses, means for selecting a desired transponder, first means for counting time controlled by said selecting means, means to produce request pulses, means for producing interrogation pulses, means coupling said counting means to both said pulse producing means, said transmitting means being coupled to both said pulse producing means to transmit said interrogation pulses and said request pulses with a predetermined time interval between said interrogation pulse and said request pulse said time interval denoting the location of said desired transponder, each said transponder comprising a receiver responsive to said interrogation pulses, second counting means coupled to said receiver, means for producing reply pulses at times determined by the known location of said transponder whereby a coincidence of said request pulses and said reply pulses is created only at said desired transponder, means for detecting coincidence at each said transponder and means coupled to said coincidence means for transmitting additional pulses.

12. A system for providing a position roll call of a plurality of transponders at known positions comprising a central beacon, a plurality of transponders at known positions relative said beacon said beacon comprising means for transmitting pulses, means for selectively providing a pair of trigger pulses separated according to the range and bearing of a desired transponder relative said beacon, said separation being the total of major time intervals indicative of the range of said transponder from said central beacon and the total of the subdivisions of a major time interval indicating the bearing of said transponder relative said central beacon, said trigger pulses coupled to said transmitting means to cause said transmitting means to be keyed to send first and second pulses whose separation is the same as the separation of said pair of trigger pulses and will affect only the desired transponder of said plurality of transponders.

References Cited in the file of this patent

UNITED STATES PATENTS

| | | |
|---|---|---|
| 2,554,893 | Brunn | May 29, 1951 |
| 2,595,141 | Herbst | Apr. 29, 1952 |
| 2,689,953 | Litchford et al. | Sept. 21, 1954 |